(12) United States Patent
Martin et al.

(10) Patent No.: US 10,747,647 B2
(45) Date of Patent: Aug. 18, 2020

(54) METHOD, APPARATUS AND SYSTEM FOR DIAGNOSING A PROCESSOR EXECUTING A STREAM OF INSTRUCTIONS

(71) Applicant: ARM LIMITED, Cambridge (GB)

(72) Inventors: Damien Robin Martin, Alpes-Maritimes (FR); Clément Marc Demongeot, Arcueil (FR); Michael John Williams, Ely (GB)

(73) Assignee: ARM Limited, Cambridge (GB)

( * ) Notice: Subject to any disclaimer, the term of this patent is extended or adjusted under 35 U.S.C. 154(b) by 46 days.

(21) Appl. No.: 16/063,802

(22) PCT Filed: Dec. 22, 2015

(86) PCT No.: PCT/GB2015/054121
§ 371 (c)(1),
(2) Date: Jun. 19, 2018

(87) PCT Pub. No.: WO2017/109442
PCT Pub. Date: Jun. 29, 2017

(65) Prior Publication Data
US 2019/0303265 A1 Oct. 3, 2019

(51) Int. Cl.
*G06F 11/00* (2006.01)
*G06F 11/36* (2006.01)
(Continued)

(52) U.S. Cl.
CPC .......... *G06F 11/366* (2013.01); *G06F 9/3004* (2013.01); *G06F 9/3005* (2013.01);
(Continued)

(58) Field of Classification Search
CPC ............... G06F 11/362; G06F 11/3636; G06F 11/3664; G06F 11/3644; G06F 9/3812
See application file for complete search history.

(56) References Cited

U.S. PATENT DOCUMENTS 8,429,622 B2* 4/2013 Nanjundaswamy .. G06F 11/362
717/129
8,839,038 B2 9/2014 Williams et al.
(Continued)

OTHER PUBLICATIONS

International Search Report and Written Opinion of the ISA for PCT/GB2015/054121, dated Sep. 5, 2016, 16 pages.
(Continued)

*Primary Examiner* — Loan L. T. Truong
(74) *Attorney, Agent, or Firm* — Nixon & Vanderhye P.C.

(57) ABSTRACT

A method, apparatus and system are provided for diagnosing a processor executing a stream of instructions by causing the processor to execute the stream of instructions in a sequence of stages with a diagnostic exception being taken between each stage. The method involves controlling the processor in a current stage, when a point is reached where the diagnostic exception is to be taken, to store in a storage location type indicator information comprising a type indicator for a current instruction in the stream and a type indicator for a next instruction in the stream. The diagnostic exception is then taken, causing a diagnostic operation to be performed which includes accessing the type indicator information from the storage location and, dependent on the type indicator for the current instruction and the type indicator for the next instruction, determining control information to identify at least one trigger condition for a next diagnostic exception. Thereafter, return from the diagnostic exception causes the processor to operate in a next stage in accordance with the determined control information. By capturing information not only about the current instruction being processed at the point that the diagnostic exception is to be taken, but also information about the next instruction, this can provide a significant improvement in the efficiency of the handling of the diagnostic process.

18 Claims, 18 Drawing Sheets

(51) Int. Cl.
*G06F 9/30* (2018.01)
*G06F 9/38* (2018.01)
*G06F 9/52* (2006.01)

(52) U.S. Cl.
CPC ........ *G06F 9/30043* (2013.01); *G06F 9/3861* (2013.01); *G06F 9/52* (2013.01); *G06F 11/3632* (2013.01); *G06F 11/3636* (2013.01); *G06F 11/3604* (2013.01)

(56) References Cited

U.S. PATENT DOCUMENTS

| | | | | |
|---|---|---|---|---|
| 2004/0073780 | A1* | 4/2004 | Roth | G06F 11/3664 712/227 |
| 2008/0127035 | A1 | 5/2008 | Lev et al. | |
| 2009/0007119 | A1* | 1/2009 | Blumrich | G06F 11/3636 718/102 |
| 2010/0100770 | A1* | 4/2010 | Mejdrich | G06F 11/362 714/37 |
| 2011/0022896 | A1* | 1/2011 | Drepper | G06F 11/3648 714/38.13 |
| 2012/0102469 | A1* | 4/2012 | Kapoor | G06F 11/362 717/129 |
| 2012/0239913 | A1* | 9/2012 | Williams | G06F 11/3632 712/227 |
| 2012/0291017 | A1* | 11/2012 | Fuhrer | G06F 11/362 717/125 |
| 2014/0344621 | A1* | 11/2014 | Williams | G06F 11/3632 714/34 |

OTHER PUBLICATIONS

Anonymous, "Kyle McMartin—[PATCHv2] aarch64: detect atomic sequences like other ll/sc architecture", Sep. 22, 2015, XP55286496, 4 pages.

Armejach et al., "HARP: Adaptive abort recurrence prediction for Hardware Transactional Memory:, 20th Annual International Conference on High Performance Computing", IEEE, Dec. 18, 2013, XP32587440, pp. 196-205.

* cited by examiner

| MOE | Mnemonic | Debug state entry caused by |
|---|---|---|
| 0b0001 | BRK | Breakpoint |
| 0b0100 | HALT | External debug request |
| 0b0110 | $STEP_{OK}$ | Halting step, normal [not predetermined type] |
| 0b0111 | $STEP_{EXCL}$ | Halting step, exclusive [predetermined type] |
| 0b1000 | OSUC | OS unlock catch |
| 0b1001 | RC | Reset catch |
| 0b1010 | WPT | Watchpoint |
| 0b1011 | HLT | HLT instruction |
| 0b1100 | TRAP | Software access to debug register |
| 0b1101 | EC | Exception catch |
| 0b1110 | $STEP_{UNKNOWN}$ | Halting step, no syndrome [unknown type] |

Meaning of EDSCR[MOE] bits, all other values are reserved

FIG. 7C

METHOD, APPARATUS AND SYSTEM FOR DIAGNOSING A PROCESSOR EXECUTING A STREAM OF INSTRUCTIONS

This application is the U.S. national phase of International Application No. PCT/GB2015/054121 filed 22 Dec. 2015, which designated the U.S. the entire contents of which is hereby incorporated by reference.

BACKGROUND

The present technique relates to a method, apparatus and system for diagnosing a processor executing a stream of instructions.

It is known to provide data processing systems with diagnostic mechanisms which can be used to perform diagnostic operations (e.g. software and hardware fault identification and analysis (debug)) upon the data processing systems so as to assist in the development of hardware, operating systems, application programs, overall system designs and the like.

One useful diagnostic approach is the ability to control a processor to single step through a program. In accordance with such an approach, the processor will execute a single instruction and then a diagnostic exception will be taken to allow the state of the system to be analysed.

One problem that can arise when single stepping through code is if code is encountered that has a different execution path when an exception is taken between instructions. This can be particularly problematic if the different execution path creates an infinite loop, as can happen when performing single stepping in respect of a section of code including a load exclusive instruction and an associated store exclusive instruction. This issue is discussed in commonly owned U.S. Pat. No. 8,839,038, the entire contents of which are hereby incorporated by reference, that patent describing an improved mechanism for dealing with such instructions, by identifying when an instruction such as a load exclusive instruction has been single stepped, and then temporarily exiting single stepping in order to allow an alternative mechanism to be implemented.

It would be desirable to further improve the efficiency of the process of diagnosing a processor executing a stream of instructions in situations where the execution path of the code may change by virtue of an exception being taken between instructions.

SUMMARY

In a first example configuration, there is provided a method of diagnosing a processor executing a stream of instructions by causing the processor to execute the stream of instructions in a sequence of stages with a diagnostic exception being taken between each stage, the method comprising: controlling said processor in a current stage, when a point is reached where the diagnostic exception is to be taken, to store in a storage location type indicator information comprising a type indicator for a current instruction in the stream and a type indicator for a next instruction in said stream; taking the diagnostic exception; performing a diagnostic operation in response to said diagnostic exception, said diagnostic operation comprising accessing said type indicator information from said storage location and, dependent on the type indicator for the current instruction and the type indicator for the next instruction, determining control information to identify at least one trigger condition for a next diagnostic exception; and returning from the diagnostic exception to cause the processor to operate in a next stage in accordance with the determined control information.

In a second example configuration, there is provided an apparatus for diagnosing a processor executing a stream of instructions by causing the processor to execute the stream of instructions in a sequence of stages with a diagnostic exception being taken between each stage, said processor being controlled in a current stage, when a point is reached where the diagnostic exception is to be taken, to store in a storage location type indicator information comprising a type indicator for a current instruction in the stream and a type indicator for a next instruction in said stream, the diagnostic apparatus comprising: diagnostic circuitry to perform a diagnostic operation in response to said diagnostic exception being taken; and an interface mechanism from which to issue control information to the processor, and via which said type indicator information stored by the processor can be retrieved; the diagnostic circuitry being arranged, when performing said diagnostic operation, to retrieve via said interface mechanism said type indicator information from said storage location and, dependent on the type indicator for the current instruction and the type indicator for the next instruction, to determine the control information to identify at least one trigger condition for a next diagnostic exception, and to provide said control information via said interface mechanism to said processor so that, on returning from the diagnostic exception, the processor is caused to operate in a next stage in accordance with the determined control information.

In a further example configuration, there is provided an apparatus comprising:

a processor to execute a stream of instructions in a sequence of stages with a diagnostic exception being taken between each stage; and storage accessible to the processor; said processor being arranged in a current stage, when a point is reached where the diagnostic exception is to be taken, to store, in a storage location of said storage, type indicator information comprising a type indicator for a current instruction in the stream and a type indicator for a next instruction in said stream; said storage being updated to provide control information for a next stage in response to a diagnostic operation being performed on taking the diagnostic exception, the control information being determined dependent on the type indicator for the current instruction and the type indicator for the next instruction as stored for the current stage, and the control information identifying at least one trigger condition for a next diagnostic exception; said processor being arranged, on return from the diagnostic exception, to operate in the next stage in accordance with the control information stored in said storage.

In a yet further example configuration, there is provided a system comprising: a processor to execute a stream of instructions in a sequence of stages with a diagnostic exception being taken between each stage, the processor being controlled in a current stage, when a point is reached where the diagnostic exception is to be taken, to store in a storage location type indicator information comprising a type indicator for a current instruction in the stream and a type indicator for a next instruction in said stream; and diagnostic circuitry, responsive to the diagnostic exception being taken, to perform a diagnostic operation, said diagnostic operation comprising accessing said type indicator information from said storage location and, dependent on the type indicator for the current instruction and the type indicator for the next instruction, determining control information to identify at least one trigger condition for a next diagnostic exception;

the processor being arranged, on return from the diagnostic exception, to operate in a next stage in accordance with the determined control information provided by the diagnostic circuitry.

BRIEF DESCRIPTION OF THE DRAWINGS

The present technique will be described further, by way of example only, with reference to embodiments thereof as illustrated in the accompanying drawings, in which:

FIG. 7c shows a table of possible values for indicators indicating reasons for a debug event along with type of instruction stepped;

DESCRIPTION OF EMBODIMENTS

Figure 1:
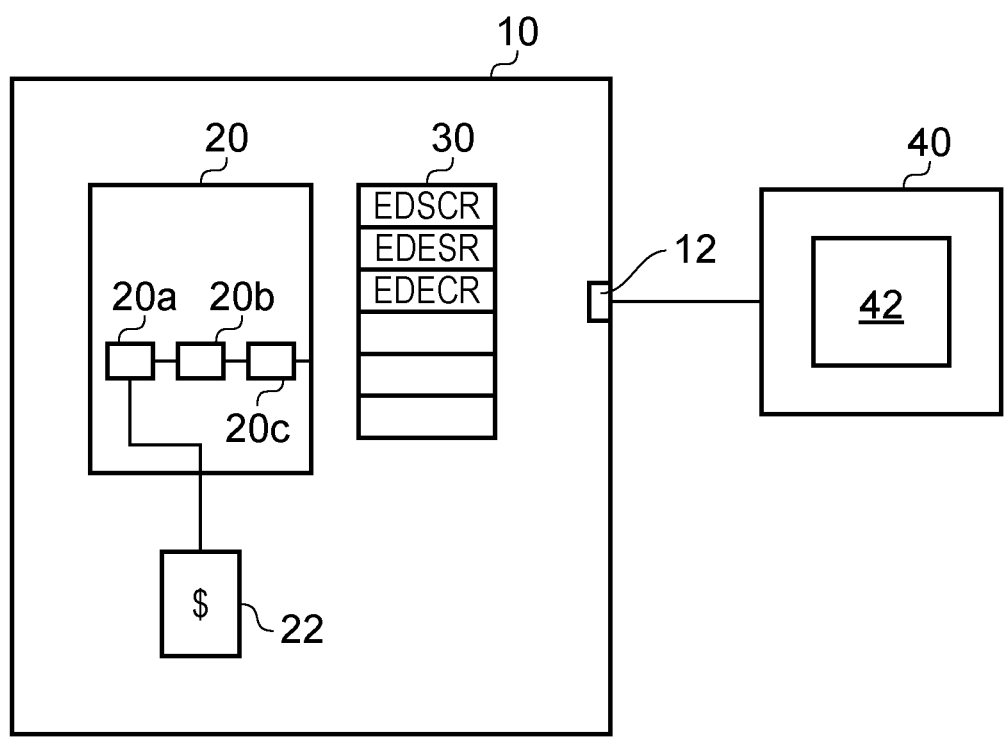
FIG. 1 shows a data processing apparatus with a remote diagnostic apparatus connected to it according to an embodiment.

Before discussing the embodiments with reference to the accompanying figures, the following description of embodiments is provided.

In accordance with one embodiment a method of diagnosing a processor executing a stream of instructions is provided, the method causing the processor to execute the stream of instructions in a sequence of stages, with a diagnostic exception being taken between each stage. The method comprises controlling the processor in a current stage, when a point is reached where the diagnostic exception is to be taken, to store in a storage location (for example a register accessible to the processor) type indicator information. The type indicator information comprises a field to provide a type indicator for a current instruction in the stream, and an additional field to provide a type indicator for a next instruction in the stream. In response to the diagnostic exception then being taken, a diagnostic operation is performed, during which the type indicator information is accessed from the storage location. Dependent on the type indicator for the current instruction and the type indicator for the next instruction, the diagnostic operation determines control information to identify at least one trigger condition for a next diagnostic exception. Thereafter, a return from the diagnostic exception causes the processor to operate in the next stage in accordance with the determined control information.

By seeking to capture not only a type indicator relevant to the current instruction being processed at the point at which the diagnostic exception is to be taken, but also a type indicator for a next instruction in the stream, it has been found that this can significantly improve the efficiency of the diagnostic process. In particular, it can reduce the overall number of stages that are required to perform the diagnosis process on the stream of instructions.

For example, in situations where it can be determined that that next instruction is of a predetermined type that could give rise to some inefficiencies if it were sought to execute that instruction in a next stage using a particular diagnostic mode, then instead it can be determined to use an alternative diagnostic mode when returning from the diagnostic exception in order to trigger the next stage. As one specific example, the process can be used to detect situations where the next instruction is a load exclusive instruction before that load exclusive instruction is actually executed, and hence it can be arranged that when the load exclusive instruction is subsequently executed in the next stage, it is not executed using a single stepping mode of operation, which could give rise to inefficiencies in the diagnostic process by requiring an additional stage to be performed to remove the potential problems (for example entry into infinite loop) that can arise from executing a load exclusive instruction in a single stepping mode.

In contrast to the earlier described commonly owned U.S. Pat. No. 8,839,038 which identified when a load exclusive instruction had been executed, and then took appropriate action in a next stage of the diagnostic process, when using the above described technique the exclusive load instruction can be identified before it is even executed, hence enabling the process to proceed directly to use of an appropriate diagnostic mode on return from the diagnostic exception, thereby reducing the overall number of stages required to perform diagnosis of the stream of instructions.

The control information determined during performance of the diagnostic operation can include further information in addition to the one or more trigger conditions for the next diagnostic exception. For example, in one embodiment the control information may identify a first instruction that the processor is to execute following the return from the diagnostic exception. This allows flexibility in specifying where within the stream of instructions the next stage begins.

In one embodiment, in at least one of the stages the processor operates in a single step mode where a single instruction from the stream is executed and then the diagnostic exception is taken.

In such an embodiment, the diagnostic operation may be arranged, when the type indicator information for the current stage indicates that at least one of the current instruction and the next instruction is of a predetermined type, to set the control information so that on returning from the diagnostic exception the processor operates in the next stage in a mode other than the single step mode. Hence, when the type indicator information indicates that either the current instruction or the next instruction is of a predetermined type, this can be used to ensure that in the next stage a single step mode is not used. It should be noted that the current stage that was being performed prior to taking the diagnostic exception may or may not have been using the single step mode. Hence the above approach may in some instances cause the single step mode to be exited between the current stage and the next stage, whilst in other instances it may cause the process to remain out of the single step mode for the next stage where the current stage also did not use the single step mode.

The above mentioned "mode other than the single step mode" may take a variety of forms, but in one embodiment is a mode that causes the processor to execute a plurality of instructions within the instruction stream prior to the next diagnostic exception being taken.

There are a number of ways in which the control information can be specified in order to cause the processor to execute a plurality of instructions in the next stage. For example, watchpoint, breakpoint, vector catch mechanisms or any other suitable mechanism can be used to identify when the next diagnostic exception should be taken. In one particular embodiment, the diagnostic operation is arranged, when the type indicator information for the current stage indicates that at least one of the current instruction and the next instruction is of a predetermined type, to set the control information to identify at least one breakpoint within said instruction stream, such that in the next stage the plurality of instructions are executed until said at least one breakpoint is reached, provided no other exceptions are received during execution of said plurality of instructions, and the diagnostic exception taken at the end of the next stage is a diagnostic breakpoint exception in response to reaching said at least one breakpoint. This provides an efficient mechanism for identifying a sequence of instructions that should be executed without any diagnostic exception being taken between them.

The instruction of said predetermined type can take a variety of forms. Typically, it will be an instruction that is of a type that can cause the execution path of the code to be altered as a result of taking exception between that instruction and a subsequent instruction. In one particular embodiment, the instruction of the predetermined type is a load exclusive instruction that sets an exclusive monitor to indicate that the stream of instructions has exclusive access to one or more storage locations. In particular, a load-exclusive instruction is used to return the current value at a specified storage location, and in addition sets an exclusive monitor so as to indicate that the instruction stream currently being executed has exclusive access to particular storage locations. A store exclusive instruction can then be executed to store data to such a storage location provided the exclusive monitor is still set. The store exclusive instruction will however fail if the exclusive monitor is no longer set for the relevant instruction stream. This may be the case, for example, if another instruction stream (such as that associated with another program thread) in the meantime executes a load exclusive instruction that causes it to set the relevant exclusive monitor for its instruction stream.

However, when single stepping through the code, the single stepping mechanism will essentially produce a similar effect, hence causing the store exclusive instruction to later fail. In particular, once the exclusive monitor has been claimed by setting it, a diagnostic exception will be taken and on return from the exception the exception handler will clear the exclusive monitor. This is because when an exception is taken the exception handler may not return to the code that was previously being executed but could return to different code, and thus the exclusive monitor should be cleared so as to ensure that the instruction stream returned to does not have exclusive access to the relevant storage location(s).

However, when single stepping, this means that when the store exclusive instruction is subsequently reached it will fail, which will trigger a return to the previous steps of seeking to claim the exclusive monitor, which will cause the exclusive monitor to be claimed (i.e. set), but then later to be cleared by the exception return. As a result, in such a single stepping arrangement, the store exclusive instruction will repeatedly fail and the program will never progress.

In accordance with the present technique, this situation can be avoided by identifying situations where either the current instruction or the next instruction is such a load exclusive instruction, and at that point avoiding use of the single stepping mode for the next stage. When the current instruction is determined to be a load exclusive instruction, then it will already have been executed, and the next stage can be used to take appropriate corrective action to ensure that the above-mentioned infinite loop problem does not arise. However, in situations where the next instruction is determined to be a load exclusive instruction, then it will not yet have been executed, and accordingly appropriate action can be taken more efficiently, hence improving the overall efficiency of the diagnosis process.

In one embodiment, the current instruction for which a type indicator is captured is a final instruction being processed by the processor prior to the diagnostic exception being taken. That final instruction may in fact be the final instruction executed by the processor prior to the diagnostic exception, or it may instead be a final instruction that is currently being handled by the processor. For example, it may be the case that that final instruction is not in fact executed, with the processor deciding not to execute that instruction and instead to initiate the diagnostic exception. In either event, the next instruction for which a type indicator is also captured will be an instruction that has not been executed by the processor in the current stage.

In addition to using the type indicator for the next instruction to influence what diagnostic mode is used upon return from the diagnostic exception, in certain configurations of a data processing system such type indicator information about the next instruction can also be used to provide further efficiency improvements in the handling of the diagnosis process. For example, in one embodiment it may be the case that the processor being subjected to the diagnosis process is provided within processing circuitry used to execute a plurality of program threads in parallel. In one such example arrangement, the processor being diagnosed may be executing a stream of instructions of a first program thread, whilst other program threads are executed on other processors within the system, allowing multiple program threads to be executed in parallel.

In situations where a plurality of program threads are being executed in parallel the diagnostic operation may be further arranged, when the type indicator information for the current stage indicates that the next instruction is of a predetermined type, to check whether any of the other program threads in the plurality of program threads will have their execution behaviour modified were the first program thread to execute said next instruction upon returning from the diagnostic exception, and in that event to take a predetermined action prior to returning from the diagnostic exception.

Accordingly, in such a situation, potential effects on execution behaviour of other program threads can be taken into account when performing a diagnostic operation in respect of the first program thread. This is useful in a variety of situations. For example, in one embodiment it may be the case that it is desirable to seek to diagnose the first program thread whilst another program thread is executing normally. However, when provided with type information for the next instruction, which as mentioned earlier is an instruction that has not yet been executed, the diagnostic operation can seek to detect situations where, if that next instruction is executed on return from the diagnostic exception, there is an expectation that the execution of that instruction could cause a change in the execution behaviour of the other program thread. Considering the earlier example of load exclusive instructions, this could for example be the case where the other program thread is at a point in its execution where it requires, or will shortly require, the relevant exclusive monitor.

The predetermined action that is taken during the diagnostic operation prior to returning from the diagnostic exception can take a variety of forms. However, in the above type of scenario, then in one embodiment the predetermined action comprises introducing a delay before returning from the diagnostic exception, such that the return from the diagnostic exception occurs at a time where the other program threads will not have their execution behaviour modified by the first program thread executing said next instruction upon returning from the diagnostic exception. The delay can be introduced in a variety of ways. For example, a predetermined delay could be introduced, whereafter the diagnostic operation can recheck progress of the other program thread. However, alternatively the diagnostic circuitry running the diagnostic operation may be arranged to set a control value in association with the processor executing the other program thread, so that the diagnostic circuitry is notified once the other thread has progressed to a point where it no longer requires the exclusive monitor.

Whilst the above approach can ensure that the other thread continues to execute normally, hence representing the desired behaviour of the other program thread whilst seeking to diagnose the first program thread, it can introduce some delays in the diagnosis progress for the first program thread.

Accordingly, in an alternative embodiment, it may instead be decided to halt the execution of the other program thread so as to allow a more deterministic behaviour in the diagnosis process for the first program thread. In particular, in such an embodiment, the predetermined action may comprise issuing a control signal to cause halting of execution of another program thread whose execution behaviour would be modified were the first program thread to execute said next instruction upon returning from the diagnostic exception, whereafter the processor continues to process the first program thread in the next stage on return from the diagnostic exception.

Having halted the other program thread's execution using the above mechanism, then in one embodiment execution of the other program thread can be resumed by issuance of an appropriate further control signal from the diagnostic operation when the diagnostic exception is taken following the processing of the next stage. Hence, once the relevant instructions have been executed within the code being diagnosed, then at that point the other program thread can be restarted.

Whilst in one embodiment the present technique relates to a method of diagnosing a processor as discussed above, other embodiments relate to the provision of a diagnostic apparatus for interacting with the processor to control it in the above described manner, to an apparatus consisting of a processor and associated storage configured so as to operate under the control of the diagnostic apparatus in the above described manner, and to a system containing such a processor and the diagnostic apparatus used to control that processor.

Particular embodiments will now be described with reference to the Figures.

FIGS. 1 to 7*c* are figures from commonly owned U.S. Pat. No. 8,839,038, and the following description of those figures is as set out in that US patent.

FIG. 1 shows the data processing apparatus 10 having a processor 20 for processing a stream of instructions. The processor comprises a pipeline having a fetch unit 20*a* for fetching instructions from an instruction cache 22, a decode unit 20*b* for decoding the instruction and an execution unit 20*c* for executing the decoded instructions. Data processing apparatus 10 also has a register bank 30 comprising registers for storing data used during processing. These include status registers that store a current state of the processor and at least one control register for storing control values. The status registers may be required where for example an interrupt is taken and the current state of the processor needs to be stored so that on return from the interrupt it can be restored.

Data processing apparatus 10 also has an external port 12 that connects with a diagnostic apparatus 40 which includes diagnostic circuitry 42. Diagnostic circuitry 42 is used to analyse the operation of the data processing apparatus and thus, can send signals to control the execution of the processor 20 and can receive data output from the processor for analysis.

In this embodiment, diagnostic circuitry 42 is configured to control processor 20 to operate in single step mode when it wishes to analyse the processor's execution of an instruction stream. In single step mode after execution of each instruction a diagnostic exception is taken before execution of the next instruction in the instruction stream. In this way the processor steps through a program and after each step the state of the processor can be analysed by the diagnostic circuitry 42. The diagnostic circuitry 42 controls the processor to operate in single step mode by setting a bit EDECR.SS in a control register EDECR, this bit being set indicating to the processor 20 that it should operate in single step mode. There is a further control register EDESR that has a bit EDESR.SS that is decremented when an instruction is executed and incremented by the taking of a diagnostic exception. This bit enables the processor to know if a non-diagnostic exception is taken during single step mode, whether an instruction should be executed or a diagnostic exception taken on return from the non-diagnostic exception. There is a further status register EDSCR, which has a bit field EDSCR.MOE which records the reason for taking the diagnostic exception.

When a diagnostic exception is taken diagnostic code is executed by diagnostic circuitry 42, which detects the state of the data processing apparatus 10 and stores some of this information for analysis.

When the diagnostic circuitry 42 wants to end the process it resets single step bits EDECR.SS and EDESR.SS in the control registers and the processor then reverts to normal execution mode.

In addition to controlling the processor to operate in a single step mode diagnostic circuitry 42 can also control other diagnostic operations to be performed. For example it can set breakpoints or watchpoints within the code being executed and these allow the code to be interrupted at certain set points in its execution and the state of the processor can then be analysed at these points.

Figure 2:
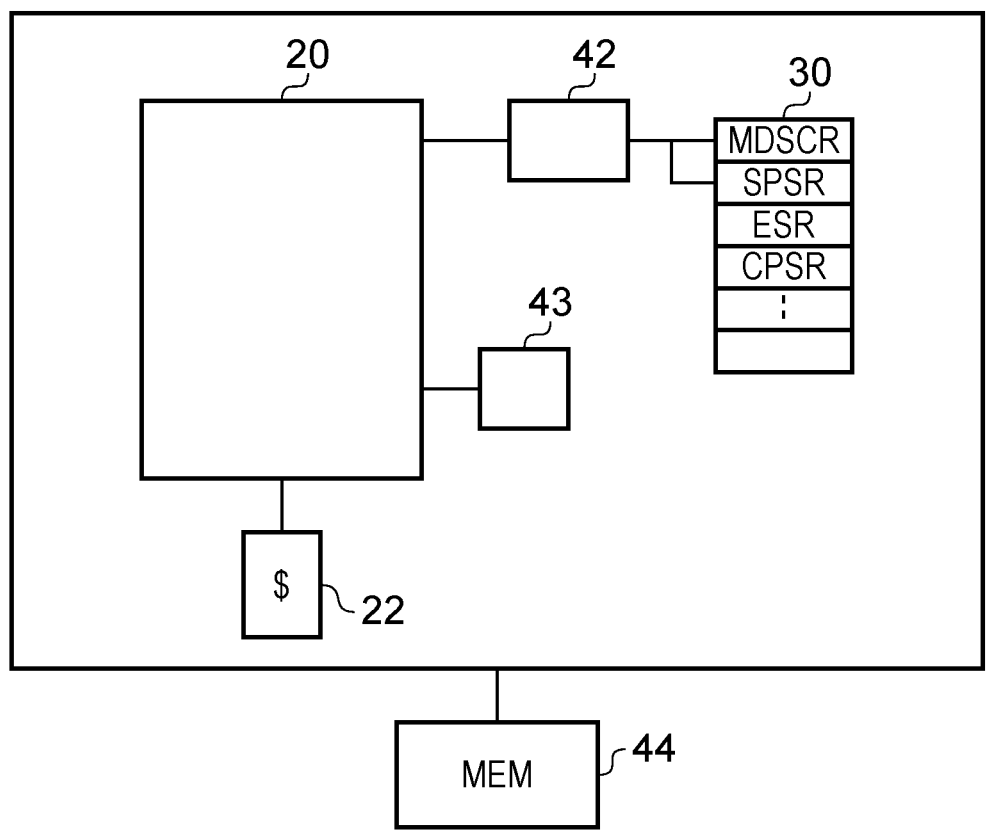
FIG. 2 shows a data processing apparatus which incorporates diagnostic circuitry according to an alternative embodiment.

Although in FIG. 1 the diagnostic circuitry 42 is shown as being external to the processing apparatus 10 in many embodiments such as in FIG. 2 it will be present inside the processing apparatus.

Thus, FIG. 2 shows a data processing apparatus 10 comprising diagnostic circuitry 42, register bank 30 and a data store for storing diagnostic software that can be executed in some embodiments by a processor within diagnostic circuitry 42, while in other embodiments on processor 20 itself. In some embodiments the diagnostic software may be stored in an external memory 44.

In the cases detailed above, taking of a diagnostic exception will trigger the diagnostic software stored in store 43 or memory 44 to be executed by processor 20. In this embodiment the values stored in register bank 30 are slightly different to those stored in the register bank of FIG. 1. In this embodiment, a user may indicate that single step diagnostic mode should be entered and the diagnostic circuitry 42 will write to the control registers in register bank 30 and set the single step bit MDSCR.SS in the MDSCR register which indicates the signal step mode and the saved step number bit SPSR.SS in the saved status register SPSR which indicates the number of steps to be taken to either 1 or 0. The diagnostic circuitry 42 then instructs the processor 20 to execute the software being debugged. The processor copies the SPSR.SS bit to a current step number bit CPSR.SS in the current status register CPSR in response to this request.

Thus, in response to these bits being set the processor processes a single instruction and sets the CPSR.SS bit to 0 to indicate it has executed the one instruction and then takes a diagnostic exception. Processor 20 copies the step number bit from the current status register CPSR.SS to the saved status register SPSR.SS as part of taking the diagnostic exception.

Processor 20 also writes further information about the diagnostic exception to a further status register ESR in register bank 30, which is used to record information about exceptions, including diagnostic exceptions.

Processor 20 executes exception handler code followed by diagnostic code and the current state of the processor is analysed. The step number bit SPSR.SS in the SPSR register is set to 1 to indicate that a next instruction in the instruction stream should now be executed. When the single step diagnostic mode is to be exited the control bits MDSCR.SS and SPSR.SS in registers SPSR and MDSCR in register bank 30 are reset.

If multiple hierarchical processing states, or exception levels, are implemented then each exception level has its own SPSR and ESR registers, SPSR_EL1 and ESR_EL1 for exception level 1, SPSR_EL2 and ESR_EL2 for exception level 2, etc.

Figure 3:
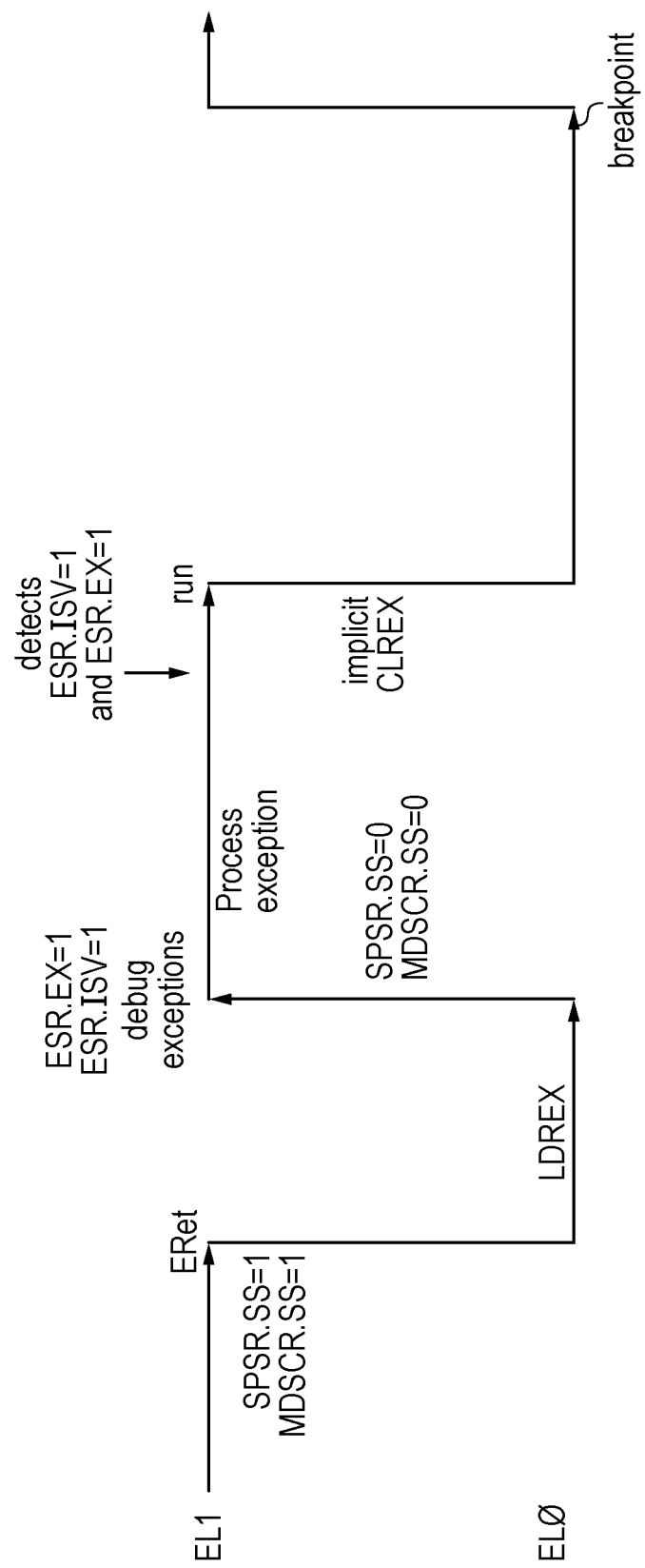
FIG. 3 shows the processing of an exclusive load instruction within an instruction stream executing in single step diagnostic mode.

FIG. 3 shows how instruction code including an exclusive load instruction LDREX is executed in single step diagnostic mode according to an embodiment of the present invention. In this figure time flows from left to right. Thus, the SPSR.SS bit and the MDSCR.SS bit are set to one indicating single step mode of operation, an exception return ERET instruction is executed to jump into the software being debugged. This copies SPSR.SS to CPSR.SS and so a single instruction from the software being debugged is executed. This instruction is an exclusive load instruction LDREX instruction and in response to the exclusive load instruction LDREX being executed, the CPSR.SS bit is set to 0 indicating that no further instruction should be executed before a diagnostic exception is taken.

The diagnostic exception is taken, CPSR.SS is copied to SPSR.SS, and a syndrome bit ESR.EX within a status register is set to 1 to indicate the exclusive load instruction LDREX was executed. A valid bit ESR.ISV within this register is also set which indicates that this is a valid value for this bit.

These syndrome and corresponding valid bits are set in embodiments of the invention whenever instructions of a particular type are executed. These may be types of instructions that exclusively claim the monitor which then indicates that they have exclusive access to a particular storage location, such as an exclusive load instruction. They may also be other types of instructions where execution of subsequent instructions within the instruction stream may be altered by an exception handler executing.

When an LDREX instruction accesses a first location the monitor bit records that this first location was accessed. The monitor has two states: "Open access" and "Exclusive access". LDREX claims access to the first location by putting the monitor into the "Exclusive access" state, and the monitor keeps a record of the accessed address, in the form of an address tag.

The monitor and its tag are checked on a store exclusive STREX instruction. The STREX instruction is a store instruction requesting a value is written to a second location. The STREX instruction only allows the write to proceed if the monitor is in the "Exclusive access" state and the STREX is writing to the tagged address, that is, the second location matches the first location. The monitor is forced back to "Open access" by the STREX itself; but also by a clear exclusive CLREX instruction, or possibly some other instruction accessing the tagged address. To avoid possible software malfunction due to an exception handler causing a change in software context between the LDREX and STREX instruction, the exclusive monitor is also forced back to "Open access" by an exception return. This may be done by software convention, for example, by always executing a CLREX instruction before an ERET, or may be enforced by the hardware forcing the monitor back to the "Open access" state on executing an ERET instruction.

For a global monitor in a multiprocessor system, the STREX only allows the write if the access is also coming from the same processor that issued the LDREX. The monitor may also be cleared to the "Open access" state by other instructions accessing other locations, such as those close to the tagged address.

Thus, in this embodiment following execution of the single LDREX instruction and in response to the MDSCR.SS control bit being set indicating single step mode, a diagnostic exception is taken and the ESR.EX and the ESR.ISV bits are set and the diagnostic code is then executed. The diagnostic code detects that the ESR.ISV valid bit and the corresponding ESR.EX syndrome bit are set and as these indicate that the previous instruction was one of the predetermined type where single step mode is not appropriate it instructs the processor to clear the MDSCR.SS and SPSR.SS bits such that on return from the exception handler the single step mode is exited and normal execution of the instruction stream occurs.

The diagnostic code will also set a suitable breakpoint indicating a point in the instruction stream, and this allows the diagnostic circuitry to break normal execution at this point and, as necessary, restart single step mode.

The processor then executes the next portion of the instruction stream until the breakpoint is reached. This breakpoint will have been set at a position in the code that is after the block of code whose execution is altered by exceptions occurring between instructions.

The code that is to be executed may for example be code trying to gain exclusive access to a semaphore variable:

Loop
  LDREX R5, [R1]; read lock (load-exclusive)
  CMP R5, #0; check if 0
  STREXEQ R5, R0, [R1]; attempt to store new value
  CMPEQ R5, #0; test if store succeeded
  BNE Loop; retry if not In this example, the code loops until it acquires the semaphore. It will then exit the loop successfully and hence a breakpoint can be put after this section of code which allows a return to single step mode.

In other code, the software may want to do something else if it doesn't acquire the semaphore. Code may be written in this way to allow for the case where another process may have acquired the semaphore so it may take some time to be available. This is a different type of code:

Loop
  LDREX R5, [R1]; read lock (load-exclusive)
  CMP R5, #0; check if 0 (semaphore is free)
  BNE SomethingElse; if not, do something else
  STREX R5, R0, [R1]; attempt to store new value
  CMP R5, #0; test if store succeeded
  BNE Loop; retry if not Note that the code loops if the STREX fails because STREX fail doesn't necessarily imply the semaphore has been taken by another process, so it is worthwhile trying again.

In this case, having stepped the LDREX the debugger finds two exit points for the loop, one at the end of this segment of code and one at the label "SomethingElse" (not shown). So the debugger has to set breakpoints on them both.

In the above embodiment, the processor resumed normal execution and continued to execute code from after the exclusive load instruction. In other embodiments, the diagnostic code may control the processor to re-execute the load exclusive instruction if this is appropriate or it may itself emulate the section of code that should not be executed in single step mode and then control the processor to start execution of the code after this section of code, in this case after the store exclusive instruction.

If the diagnostic code was not configured to control the processor to exit the single step diagnostic mode in response to the valid bit ESR.ISV and the syndrome bit ESR.EX being set, then on return from the diagnostic exception the exception handler would clear the exclusive monitor and the code would not make forward progress.

Figure 4:
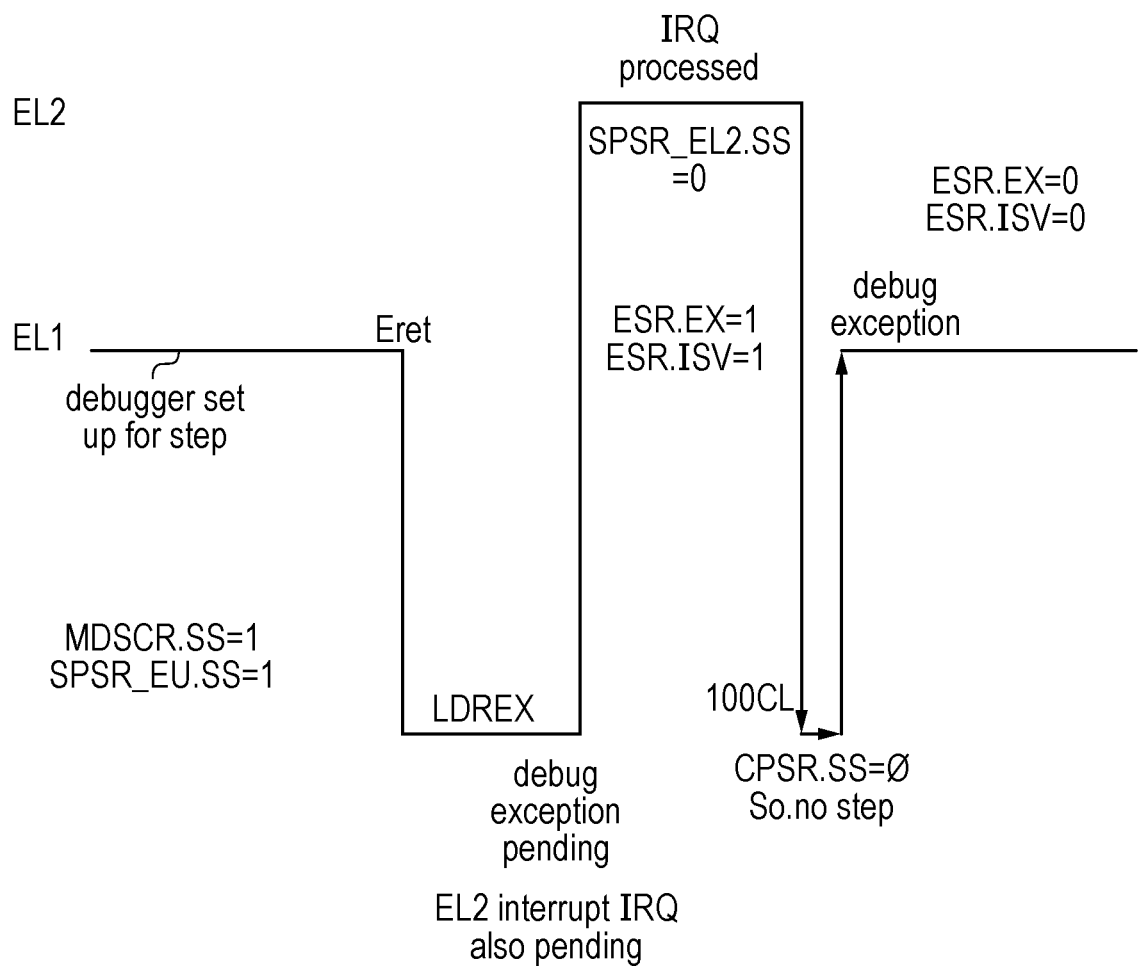
FIG. 4 shows the processing of an instruction stream in single step diagnostic mode where an interrupt occurs after the exclusive load instruction.

FIG. 4 shows an embodiment where a high priority interrupt is pending after a load exclusive instruction has executed in single step mode (MDSCR.SS=1). In this embodiment there are multiple exception levels. The diagnostic code is executing at EL1, and to indicate that a single instruction is to be executed in single step mode sets the saved step number bit in its saved status register, SPSR_EL1.SS to one. It executes an ERET instruction, as in FIG. 3, which copies SPSR_EL1.SS to CPSR.SS. After the load exclusive instruction is executed, CPSR.SS is cleared to 0. Thus, when the interrupt is taken at exception level 2 EL2 in preference to the diagnostic exception that is also pending, the processor sets the saved step number bit for EL2 SPSR_EL2.SS bit to 0. When the interrupt has been processed, an instruction for returning from the interrupt is executed. This clears the exclusive monitor (as is generally done on return from an exception) and copies SPSR_EL2.SS to CPSR.SS. As the step number bit CPSR.SS is now set to 0, a diagnostic exception is generated without executing any instruction. As no instruction was executed the processor 20 sets the valid bit associated with the exclusive monitor ESR.ISV to zero, indicating that the type of instruction that has previously been executed and might have claimed the exclusive monitor is unknown.

In response to detecting the ESR.ISV being zero the debug code needs to determine what the previously executed instruction was and thus, it requests the code for this instruction from the processor. Although there is some overhead associated with such a request, this request is only required in circumstances where an exception has occurred after an instruction has executed in single step mode, thus, it is very different from requiring each instruction to be requested.

Figure 5:
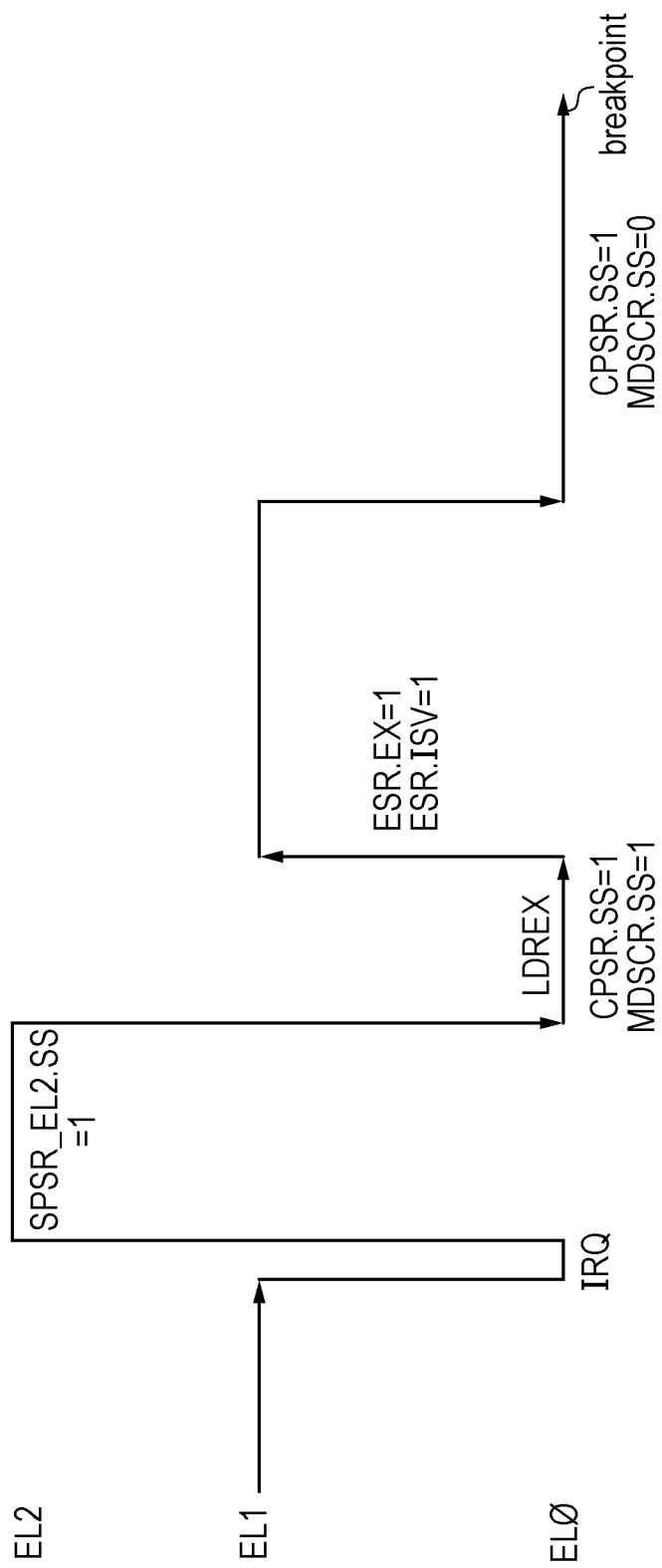
FIG. 5 shows the processing of an instruction stream in single step diagnostic mode where an interrupt occurs prior to execution of an exclusive load instruction.

FIG. 5 shows what happens when an EL2 priority interrupt is received immediately before the instruction is single stepped. In this case the step number indicator CPSR.SS is set to one when the interrupt is taken, so SPSR_EL2.SS is set to one and thus, on return from this exception the next instruction, the load exclusive is executed and then a diagnostic exception is taken. As the instruction that was executed was an exclusive load instruction the processor 20 sets the ESR.EX bit and ESR.ISV bit and thus, the diagnostic code clears the SPSR_EL1.SS and MDSCR.SS values in response to this and controls the processor to enter normal operating mode having first set one or more breakpoints.

In summary if a software step diagnostic exception is generated immediately following the instruction step, the valid bit ESR.ISV is set to one, if the software step debug exception is generated without having just executed the instruction then the valid bit ESR.ISV is set to 0.

Figure 6:
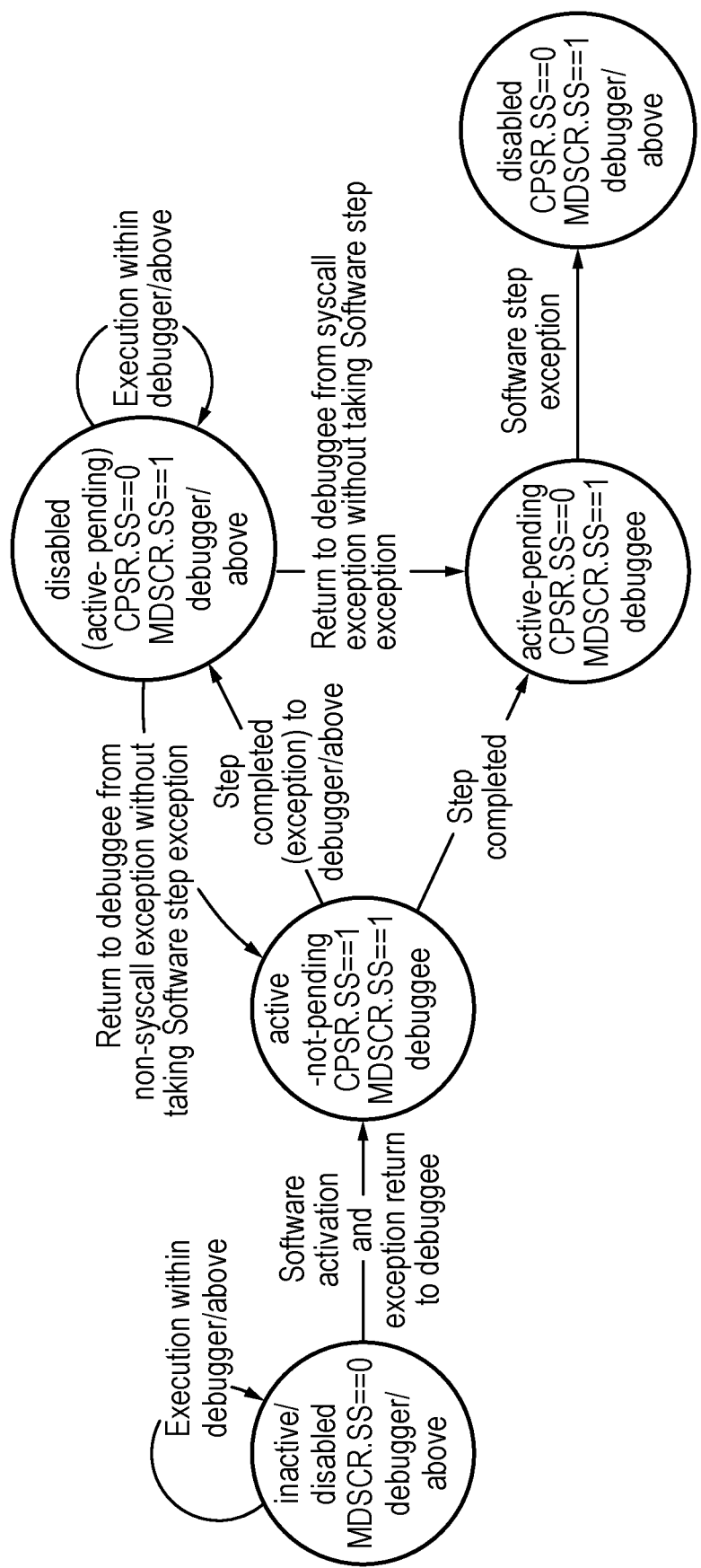
FIG. 6 shows possible states of a processor operating in the single step diagnostic mode.

FIG. 6 shows the possible states of a processor in software step mode.

If the MDSCR.SS bit is not set, then the processor is not executing in single step mode. Thus, initially the software step state of the processor is inactive and disabled and the debugger executes diagnostic software. The MDSCR.SS bit and SPSR.SS bit are then set to indicate that the step mode is to be entered on executing an exception return from the debugger. On said exception return the processor enters an active-not-pending state in which a single instruction can be executed (that is, software step is active, but at this point no diagnostic exception is pending). The processor is in this state if executing the debuggee code and the MDSCR.SS bit is set indicating single step mode and the CPSR.SS bit is set indicating one instruction is to be executed.

The processor may exit this state either by executing the single instruction or by an exception being taken. If it executes the instruction then the CPSR.SS is reset to zero indicating the single step has completed. At this stage the software step diagnostic exception is now pending, so the software step state is active-pending.

The processor may also exit this state by taking an exception other than the software step diagnostic exception, whereupon, if this exception is of higher priority than a diagnostic exception the software step state is disabled while it is handled. Depending on the type of exception, and whether it occurs before or after the instruction is executed, the SPSR.SS bit is either 1 or 0 on taking the exception, and so on return from the exception handler the processor returns to either the active-not-pending or the active-pending state.

If, however, the other exception is of lower priority than a diagnostic exception, the CPSR.SS bit is reset to zero indicating the single step has completed. At this stage the software step diagnostic exception is now pending, so the software step state is active-pending.

From the active-pending state the software step diagnostic exception is taken, copying CPSR.SS to SPSR.SS. Execution reverts to the debugger and the software step state is disabled. The MDSCR.SS bit is still set indicating single step mode and the SPSR.SS bit is clear indicating the step has executed.

Figure 7A:
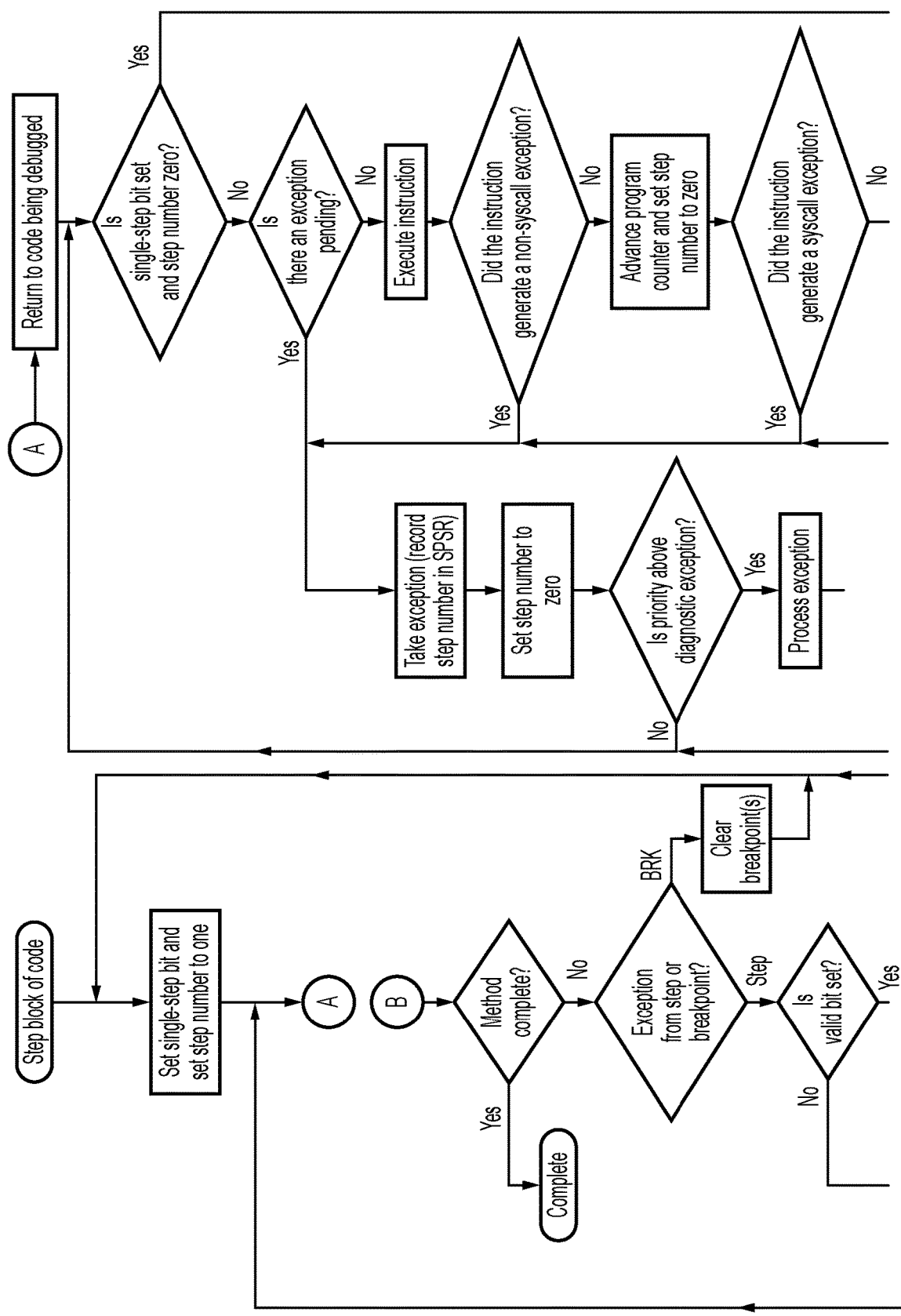
FIG. 7a shows a flow diagram illustrating steps in a method according to one approach.
Figure 7A:
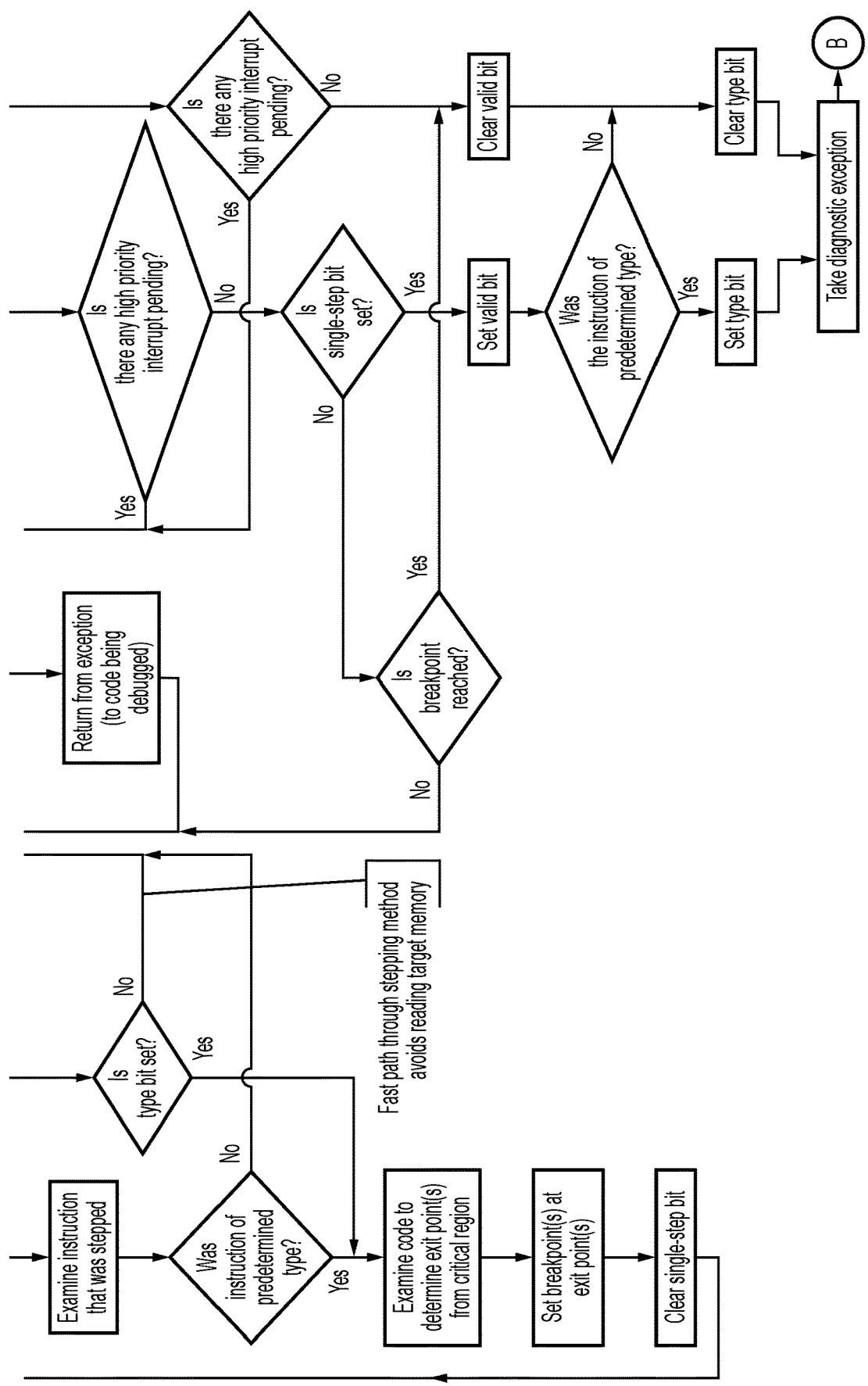

FIG. 7a shows a flow diagram illustrating steps in a method according to an embodiment of the present invention. The method starts by the diagnostic apparatus entering single step diagnostic mode by setting the single step bit in a control register and setting a step number to one.

The method then proceeds (via the connection labelled "A") by returning to the code being stepped.

As initially the step number is one, then, if there are no exceptions pending a single instruction is executed. Assuming this instruction generates no exceptions, the step number is set to zero and, if no other exceptions are pending, the apparatus also determines if the instruction was of a predetermined type, this type being the type where taking an exception after execution of the instruction will affect how the following instructions execute. If it is then the type and valid bits are set in a status register, if not the valid bit is set and the type bit is cleared. A diagnostic exception is now taken, and the method continues (via connection labelled "B").

Assuming the method is not complete (the details of how this is determined are not shown), the diagnostic apparatus determines that the diagnostic exception was due to a software step, and, if it is, it is further determined if the valid and type bits are set. If the valid bit is set and the type bit clear, then the method returns to set the step number to one (the single step control bit is still set) and continues by stepping the next instruction. Note that this is the most common path through the method, and also the optimal path.

However, if both the valid and type bits are set then this is an indication that the single step mode should be suppressed and the single step bit is cleared and breakpoint(s) are set at suitable point(s) in the code where the single step mode can be restarted.

Similarly, if the valid bit was determined not to be set on taking the diagnostic exception then the method performs a direct test of the instruction that was stepped to see if it was one of the predetermined type(s). Based on this test, the method determines whether to proceed with the single step mode, or set breakpoints(s). The method again proceeds (via the connection "A") by returning to the code being stepped.

In the case where breakpoint(s) have been used, however, the single step control bit is not set so the instructions are executed as a stream of instructions until a breakpoint is reached and a diagnostic exception is taken. Because it is later determined that the diagnostic exception was due to a breakpoint, the breakpoint(s) are removed and the single step control bit is set and the step number is set to one and so the single step mode recommences.

It should be noted that interrupts and other exceptions may occur and be taken during the execution of the stream of instructions in the normal way.

If at any time during executing instruction(s) from the code being debugged, a non-diagnostic exception is pending then it would be taken. For exceptions taken before the instruction is executed, and for exceptions other than system call (syscall) exceptions generated by the instruction being executed (such as memory management faults), the step number is unchanged (one) before taking the exception. In these cases the exception effectively cancels the instruction, meaning that if it was being stepped, it should be stepped again.

Thus, on taking the exception, the step number is recorded in the SPSR for the exception handler. The step number is then set to zero.

It should be further noted that the non-diagnostic exception may have a priority which is lower than that of a diagnostic exception. If this is the case the software step control bit is effective during processing of the non-diagnostic exception, and, because the step number is now zero, a diagnostic exception will be taken immediately. As no instruction is executed, both the valid and type bits are cleared.

For high priority interrupts taken after the instruction and syscall exceptions generated by the instruction, the instruction is effectively complete, and so the step number is set to zero before taking the exception. Only interrupts with a higher priority than the diagnostic exception and syscall exceptions can be taken at this point.

Otherwise, on return from the exception if the single step control bit is set the step number is restored from the SPSR and evaluated. If it is one then this indicates that the exception was taken before the instruction in the step mode completed and so on return from the exception the instruction in the stream is re-executed.

If it is zero then this indicates that the exception was taken after execution of the instruction in the step mode was completed but before the taking of the diagnostic exception associated with that instruction. In this case, assuming no higher priority exception is pending, a diagnostic exception is taken immediately. However, the valid bit and the associated type bit must be cleared to indicate that the value indicating the type of instruction cannot be determined as other instructions will have been executed in the meantime.

Thus on taking the diagnostic exception (via "B"), it will be determined that the valid bit is clear and the method performs a direct test of the instruction that was stepped to see if it was one of the predetermined type(s). Based on this test, the method determines whether to proceed with the single step mode, or set breakpoint(s).

The method again proceeds (via "A") by returning to the code being stepped, as described above.

Figure 7B:
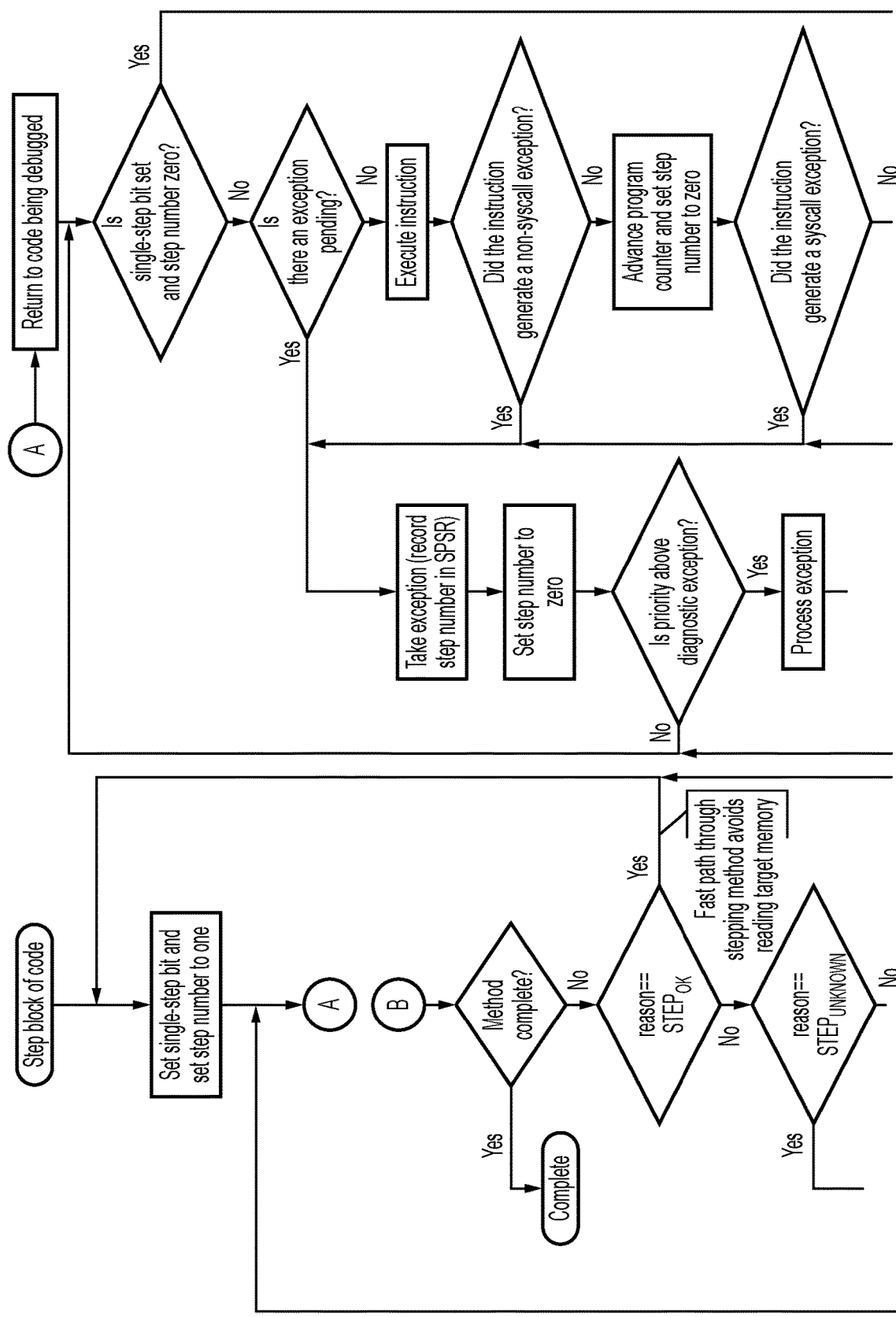
FIG. 7b shows a flow diagram illustrating steps in a method according to an alternative approach.
Figure 7B:
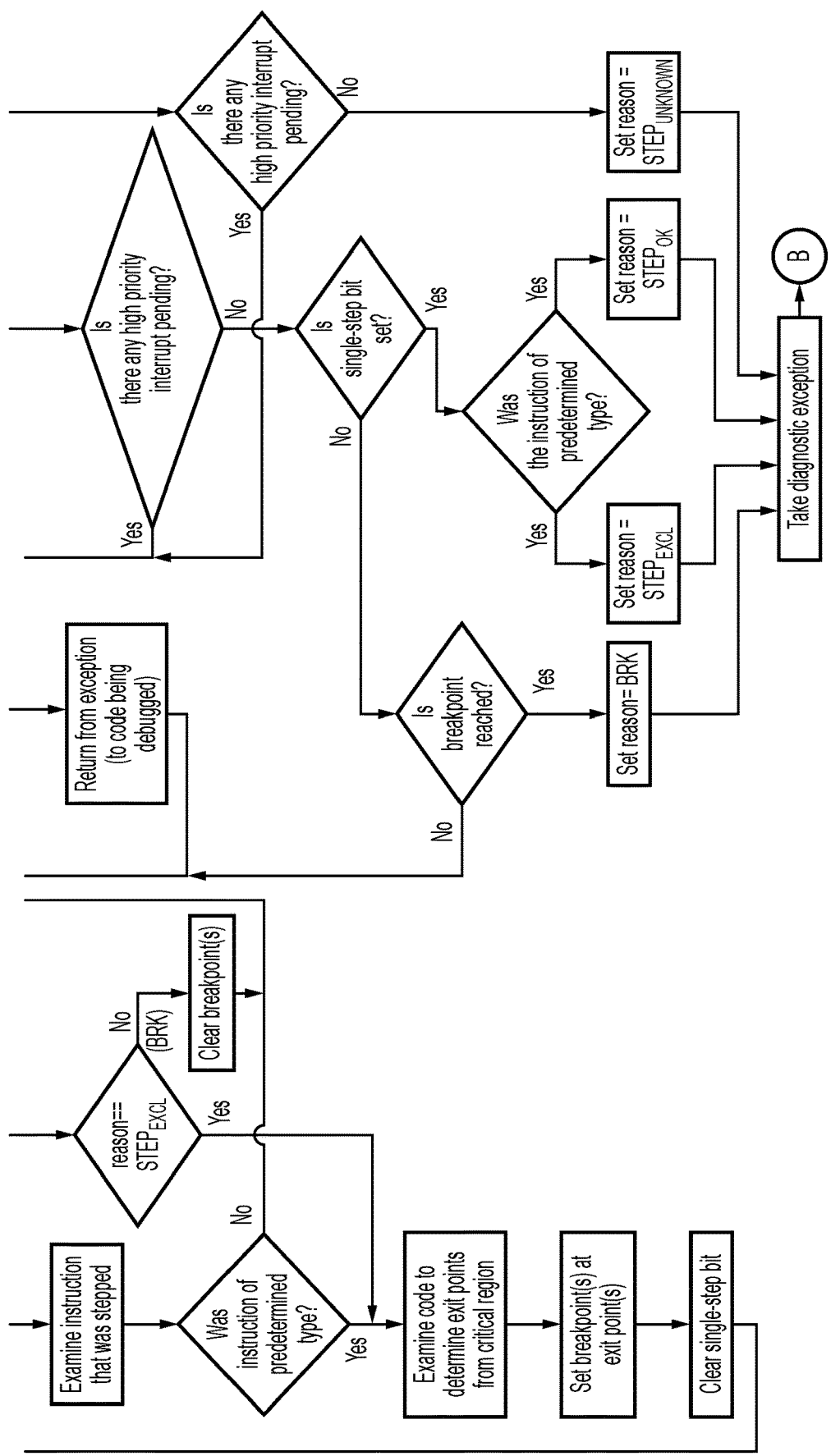

FIG. 7b shows a flow diagram illustrating steps in a method according to a further embodiment of the present invention. This method is generally used for the "external debug" case where the debugger is on an external apparatus such as is shown in FIG. 1. In this case the indicator value indicates the reason for the diagnostic exception which may be that the program is stepping, in which case the indicator value will indicate the type of instruction or it may be another reason for the debug event/diagnostic exception. Thus, this indicator value has a plurality of possible values, including: stepped instruction not of the predetermined type, stepped instruction of the predetermined type, stepped instruction of an unknown type; the values for the three types might be: 0110, 0111, and 1110. Other values are used to indicate other reasons for the debug event/diagnostic exception, such as breakpoint taken, halt request, etc. These possible values are shown in the table of FIG. 7c. Only the step and breakpoint values are considered in the flow diagram of FIG. 7b, as these are the only event types that can occur in the method.

Thus, as in FIG. 7a, the method starts by the diagnostic apparatus entering single step diagnostic mode by setting the single step bit in a control register and setting a step number to one.

The method then proceeds (via the connection labelled "A") by returning to the code being stepped.

As initially the step number is one, if there are no exceptions pending a single instruction is executed. Assuming this instruction generates no exceptions, the step number is set to zero and, if no other exceptions are pending, the apparatus also determines if the instruction was of a predetermined type, this type being the type where taking an exception after execution of the instruction will affect how the following instructions execute. If it is then the indication of type is set to STEPexcl in a status register, if it is not one of the predetermined type then the indication of type is set to STEPok. A diagnostic exception is now taken, and the method continues (via connection labelled "B").

Assuming the method is not complete (the details of how this is determined are not shown), the diagnostic apparatus determines what the indication of type is set to. If it was set to STEPok indicating that the instruction was not one of the predetermined type then the method returns to set the step number to one (the single step control bit is still set) and continues by stepping the next instruction. Note that this is the most common path through the method, and also the optimal path.

If the indication of type is set to STEPunknown indicating that the type of instruction is unknown then the method performs a direct test of the instruction that was stepped to see if it was one of the predetermined type(s). Based on this test, the method determines whether to proceed with the single step mode, or set breakpoint(s). The method again proceeds (via the connection "A") by returning to the code being stepped.

If the indication of type is set to STEPexcl indicating that the instruction stepped was of the predetermined type then this is an indication that the single step mode should be suppressed and the single step control bit is cleared and breakpoint(s) are set at suitable point(s) in the code where the single step mode can be restarted.

In the case where breakpoint(s) have been used, the single step control bit is not set so the instructions are executed as a stream of instructions until a breakpoint is reached. At this point the indication type is set to BRK as the diagnostic exception is due to a breakpoint and the diagnostic exception is taken. Later, in response to the indication of type being BRK the breakpoint(s) are removed and the single step control bit is set and the step number is set to one and so the single step mode recommences.

It should be noted that interrupts and other exceptions may occur and be taken during the execution of the stream of instructions in the normal way.

If at any time during executing instruction(s) from the code being debugged, a non-diagnostic exception is pending then it would be taken. For exceptions taken before the instruction is executed, and for exceptions other than system call (syscall) exceptions generated by the instruction being executed (such as memory management faults), the step number is unchanged (one) before taking the exception. In these cases the exception effectively cancels the instruction, meaning that if it was being stepped, it should be stepped again.

The step number is recorded in the SPSR for the exception handler. The step number is then set to zero.

It should be further noted that the non-diagnostic exception may have a priority which is lower than that of a diagnostic exception. If this is the case the software step control bit is effective during processing of the non-diagnostic exception, and, because the step number is now zero, a diagnostic exception will be taken immediately. As no instruction is executed, the indication of type is set to STEPunknown (not shown).

For high priority interrupts taken after the instruction and syscall exceptions generated by the instruction, the instruction is effectively complete, and so the step number is set to zero before taking the exception. Only interrupts with a higher priority than the diagnostic exception and syscall exceptions can be taken at this point.

Otherwise, on return from the exception if the single-step control bit is set the step number is restored from the SPSR and evaluated. If it is one then this indicates that the exception was taken before the instruction in the step mode completed and so on return from the exception the instruction in the stream is re-executed.

If it is zero then this indicates that the exception was taken after execution of the instruction in the step mode was completed but before the taking of the diagnostic exception associated with that instruction. In this case, assuming no higher priority exception is pending, a diagnostic exception is taken immediately and the indication of type is set to STEPunknown prior to the taking of the diagnostic exception to indicate that the type of instruction cannot be determined as other instructions will have been executed in the meantime.

Thus on taking the diagnostic exception (via "B"), it will be determined that the indication type is STEPunknown and the method performs a direct test of the instruction that was stepped to see if it was one of the predetermined type(s). Based on this test, the method determines whether to proceed with the single step mode, or set breakpoint(s).

Figure 8:
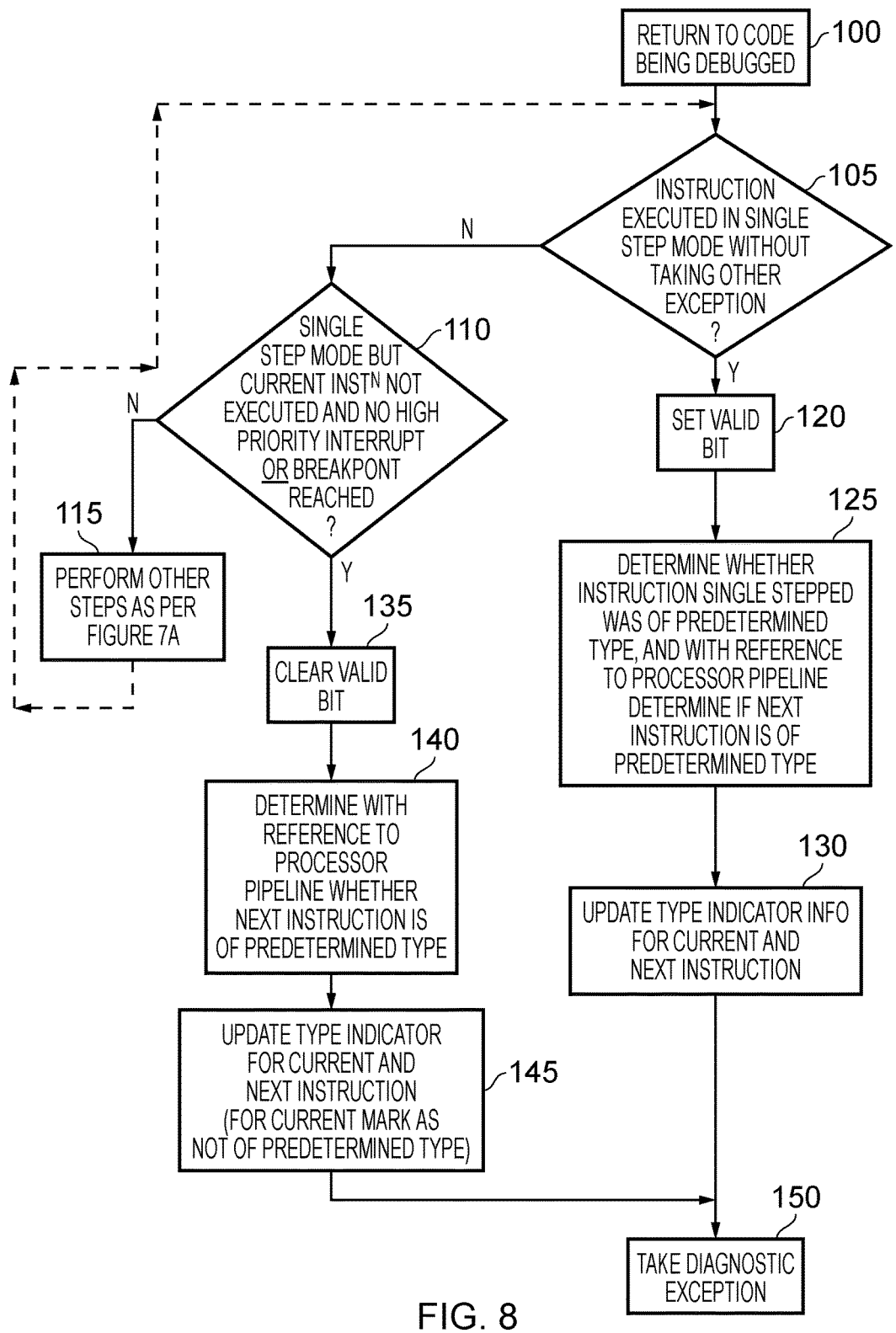
FIG. 8 is a flow diagram illustrating how the earlier described process of FIG. 7a as performed within the code being debugged is altered in accordance with one embodiment, in order to cause type information of a next instruction to be captured prior to taking the diagnostic exception.

In the above description of FIGS. 1 to 7c, it has been assumed that the type indicator information captures solely a type indicator for a current instruction being processed by the processor in a current stage at the time the point is reached where a diagnostic exception is to be taken. In accordance with the embodiments described hereafter, then in addition to capturing such a type indicator for the current instruction, the processor is also arranged to identify a type indicator for a next instruction in the stream of instructions, i.e. an instruction that is not to be executed during the current stage of the diagnostic process. FIG. 8 is a flow diagram illustrating how the earlier described process of FIG. 7a as performed within the code being debugged is altered in accordance with one embodiment, in order to cause this additional type information to be captured prior to taking the diagnostic exception.

At step 100, the process returns to the code being debugged, which is the point reached via the connection "A" shown in FIG. 7a. At step 105, it is determined whether an instruction has been executed in single step mode without taking any other exceptions. If this is the case, then the single step bit will have been set and the process will have followed the path through FIG. 7a including the "execute instruction" block, without there being an exception pending, without generating a non-syscall or a syscall exception, and without there being any high priority interrupt determined as being pending.

If this is not the case, then it is determined at step 110 whether the processor was in the single step mode but the current instruction was not executed and there was no high priority interrupt, or whether a breakpoint was reached. If this is the case, then the point will have been reached in FIG. 7a where the valid bit is to be cleared. If this is not the case, then at step 115 any necessary other steps as set out in FIG. 7a are performed.

Assuming the "yes" path is followed from step 105, then the valid bit is set at step 120, in the same way as the valid bit was set in the process of FIG. 7a. However, in the subsequent step 125, it is not only determined whether the instruction that has been single stepped was of a predetermined type, but in addition it is determined whether the next instruction is of a predetermined type. Typically the processor will be arranged in a pipelined manner, and accordingly there will be a number of instructions in flight through the pipeline at any particular point in time. Hence, by the time the current instruction is at the execute stage of the pipeline, it will typically be the case that there is sufficient information available within the pipeline, from having decoded the next instruction, to determine whether the next instruction is of a predetermined type, even though the diagnostic exception will be raised after the current instruction, and accordingly the next instruction will not be executed prior to the diagnostic exception being taken.

At step 130, the type indicator information (which may for example be stored within a register accessible to the processor) is updated to identify the type indicator for the current instruction and for the next instruction. Thereafter, the diagnostic exception is taken at step 150.

If the "yes" path from step 110 is taken, then the valid bit is cleared at step 135 in the same way as the valid bit is cleared in the relevant path in FIG. 7a. At this point, it is known that the current instruction is not of the predetermined type, and in the example of FIG. 7a, this is indicated by clearing the type bit for the current instruction. However, in accordance with the process of FIG. 8, it is still determined at step 140 with reference to the processor pipeline whether the next instruction is of the predetermined type. Thereafter, at step 145 the type indicator information is updated for the current instruction and for the next instruction (for the current instruction the relevant field will be marked to indicate that the current instruction is not of the predetermined type). Thereafter, the process proceeds to step 150 where the diagnostic exception is taken.

Whilst FIG. 8 shows how the process of FIG. 7a is modified to additionally capture information about the type of the next instruction, it will be appreciated that similar modifications could be made to the approach of FIG. 7b such that, whatever information is captured about the current instruction type, in addition a type indicator is captured indicative of the type for the next instruction, prior to the diagnostic exception being taken.

Figure 9:
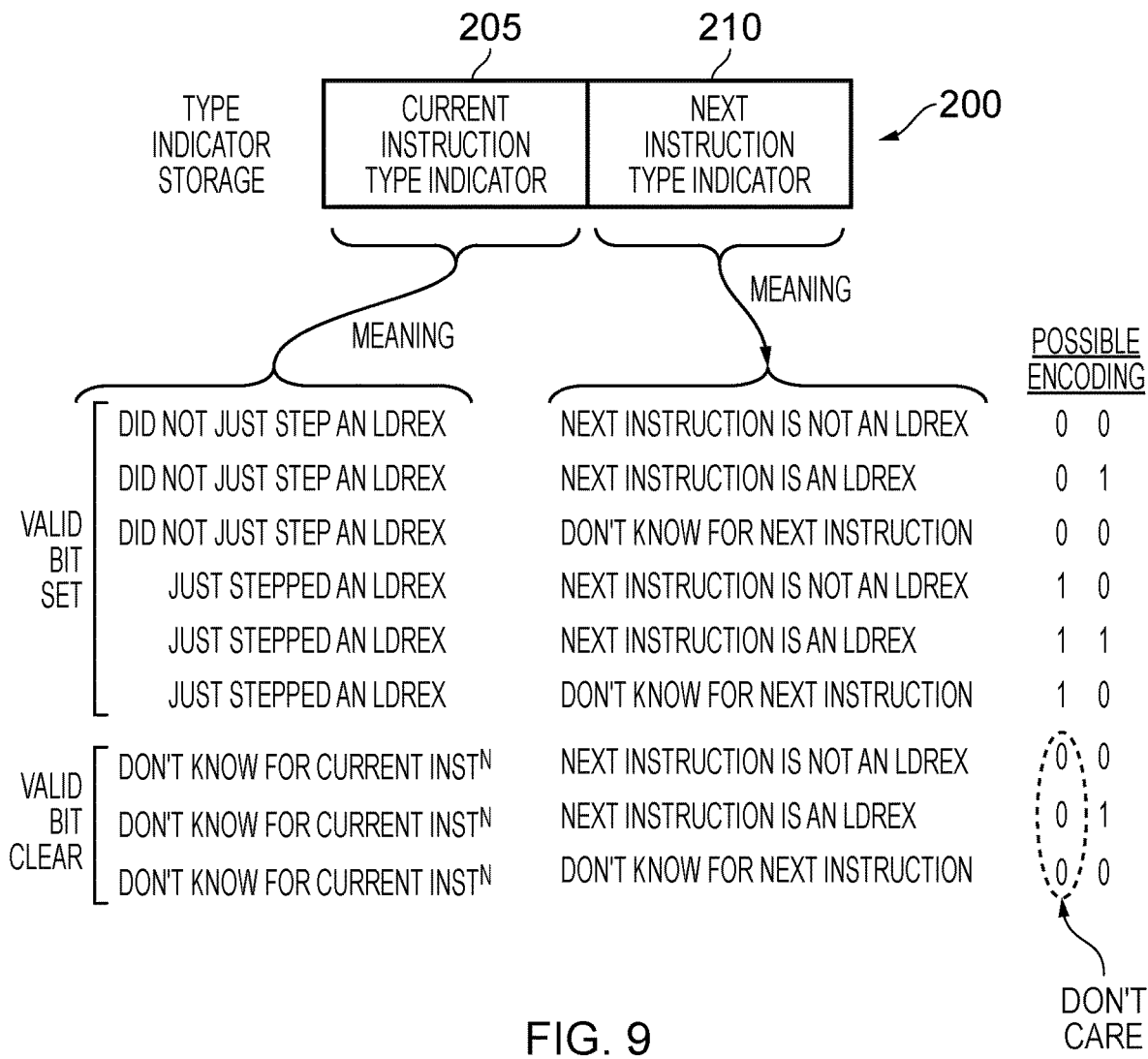
FIG. 9 illustrates two fields provided within a type indicator storage in accordance with one embodiment to capture type information about a current instruction and a next instruction.

FIG. 9 is a diagram illustrating the two fields 205, 210 that may be provided within the type indicator storage 200, which as mentioned earlier, may take the form in one embodiment of a register accessible to the processor.

In the embodiment of FIG. 9, it is assumed that there are three possible states for both the type indicator of the current instruction and the type indicator of the next instruction, namely indicating whether that instruction is of a predetermined type, is not of a predetermined type, or the type is not known. In FIG. 9, and indeed for the remaining figures to be discussed, it will be assumed that the predetermined type of instruction that is of interest is the load exclusive instruction (LDREX instruction). An example encoding that could be used within the type indicator storage for the various states is also shown in FIG. 9. In accordance with this encoding, no distinction is made between a "don't know" state for an instruction and an indication that the instruction is not an LDREX instruction. In one embodiment, in accordance with the example of FIG. 8, the valid bit will be set when it is known that the current instruction is an LDREX instruction or it is known that it is not an LDREX instruction, and the valid bit will be cleared when it is not known what the type of the current instruction is.

It will also be apparent from the earlier described FIG. 7a, and in particular the steps performed by the diagnostic circuitry, that if the valid bit is clear, then the type bit information for the current instruction is not analysed, and accordingly, when the valid bit is clear, the type information for the current instruction is effectively a "don't care" state. However, as will be apparent from the subsequent discussions, even in that situation, the type information for the next instruction can still be analysed by the diagnostic circuitry.

Figure 10:
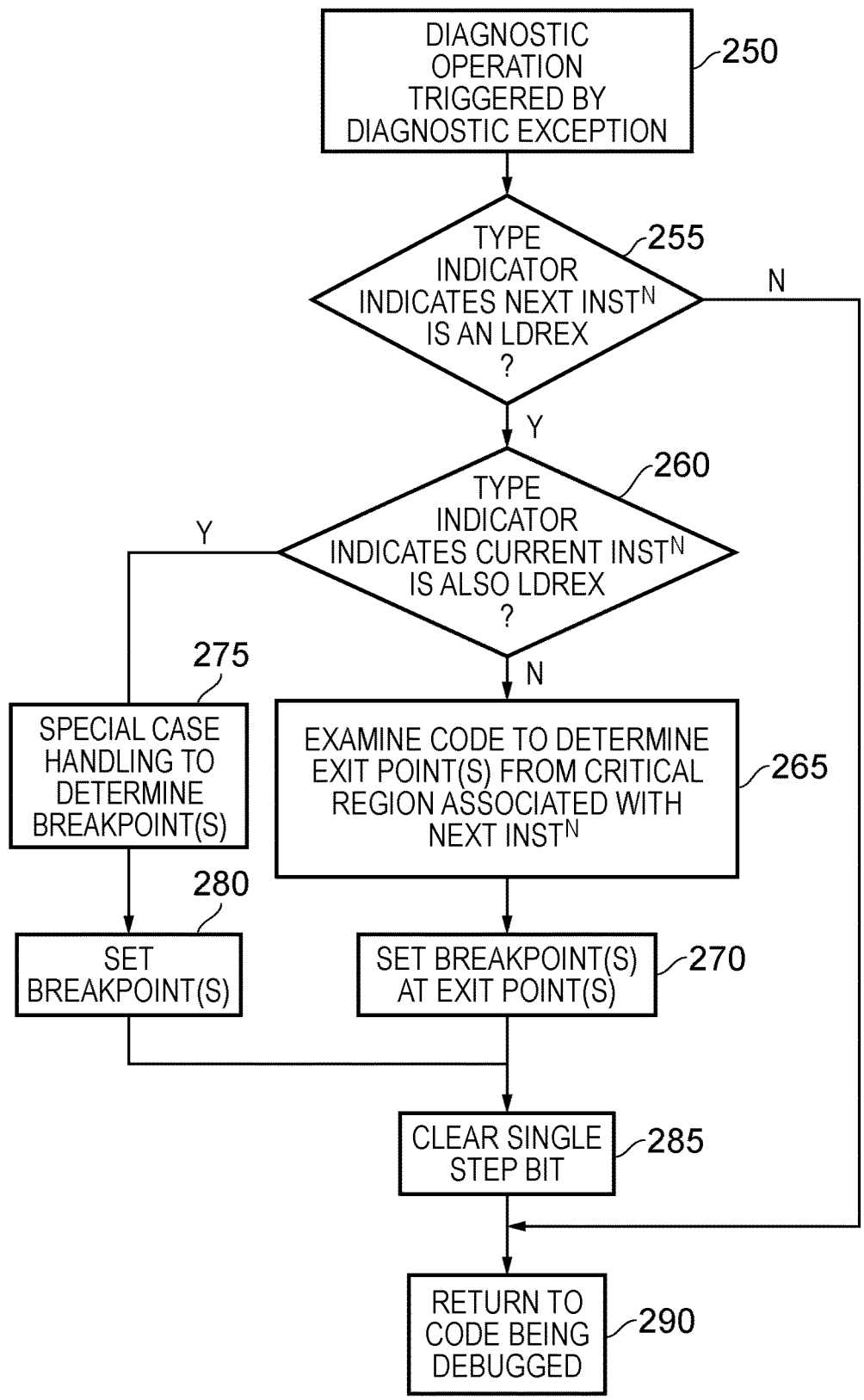
FIG. 10 is a flow diagram illustrating part of a diagnostic operation triggered by the diagnostic exception in accordance with one embodiment in order to take account of the type indicator provided for the next instruction.

FIG. 10 is a flow diagram illustrating a part of the diagnostic operation that may be performed in accordance with one embodiment in order to take account of the type indicator provided for the next instruction. Essentially, the process for FIG. 10 can be performed independently of the diagnostic operation steps performed on the basis of the type indicator for the current instruction as discussed earlier with reference to FIG. 7a, except in the special case handling step 275 of FIG. 10 which will be discussed later, and which occurs in a situation where both the current instruction and the next instruction are an LDREX instruction.

The process of FIG. 10 is triggered by a diagnostic exception at step 250, and at step 255 it is determined whether the type indicator indicates that the next instruction is an LDREX instruction. If it is not, then the process proceeds directly to step 290 where the process returns to the code being debugged, subject to completion of any remaining aspects of the diagnostic operation, including the analysis of the type indicator for the current instruction using the earlier described process of FIG. 7a.

If it is determined at step 255 that the type indicator indicates that the next instruction is an LDREX instruction, then the process proceeds to step 260, where it is determined whether the type indicator indicates that the current instruction is also an LDREX instruction. If not, then the process proceeds to step 265, where the relevant portion of the code is examined to determine exit points from the critical region associated with the next instruction. Thereafter, at step 270 breakpoints are set at each such exit point, and thereafter at step 285 the single step bit is cleared. Thereafter, the process proceeds to step 290. As a result, it will be appreciated that in situations where the current instruction is not an LDREX instruction, but it is known that the next instruction is, then in accordance with the technique described in FIG. 10 a sequence of instructions is determined that are to be executed together without a diagnostic exception between them, thereby avoiding occurrence of the potential infinite loop problem that could arise were that next instruction to be executed on returning from the diagnostic exception in a single step mode, without ever actually having to execute in a single step mode the LDREX instruction that has been identified as the next instruction. This can significantly increase the efficiency of the diagnostic process. In one embodiment the portion of code that will be identified to be executed in this manner will include code up to and including the associated store exclusive instruction for the load exclusive instruction.

If at step 260 it is determined that the current instruction is also an LDREX instruction, then the process proceeds to step 275 where special case handling is performed to determine the appropriate breakpoint(s) to set. Thereafter, the breakpoint(s) are set at step 280 and the process then proceeds to step 285.

The special case handling performed at step 275 will take a variety of forms, but essentially seeks to determine the appropriate exit points for which to set breakpoints, having regard to the presence of the two LDREX instructions. Two possible scenarios are illustrated by way of example in FIG. 11. In the first example on the left-hand side of FIG. 11, the second load exclusive instruction (i.e. the load exclusive instruction identified as the next instruction) has its associated code, including the associated store exclusive instruction, nested within the portion of code of the current LDREX instruction. At step 305 it is assumed that the current LDREX instruction is executed. This situation can arise, despite the process of FIG. 10 seeking to avoid such a load exclusive instruction being executed, for a variety of reasons. For example, it may be that the first LDREX instruction is the first instruction executed on initiating the diagnostic process, and accordingly there is no opportunity to identify the presence of that instruction before it is executed.

Following execution of the first LDREX instruction, then a single step diagnostic exception is taken at step 310. At this point, based on the type indicator information that was stored by the processor, it will be determined that both the current instruction and the next instruction are LDREX instructions, and accordingly both of the relevant sections of code will be analysed in order to decide an appropriate breakpoint to set. For the scenario shown on the left-hand side of FIG. 11, then in one embodiment the breakpoint will be set at point 320, i.e. after the store exclusive instruction associated with the current LDREX instruction. Accordingly, on returning from the diagnostic exception, the entire sequence of code down to the break point 320 will be executed without a diagnostic exception being taken in between the various instructions.

Figure 11:
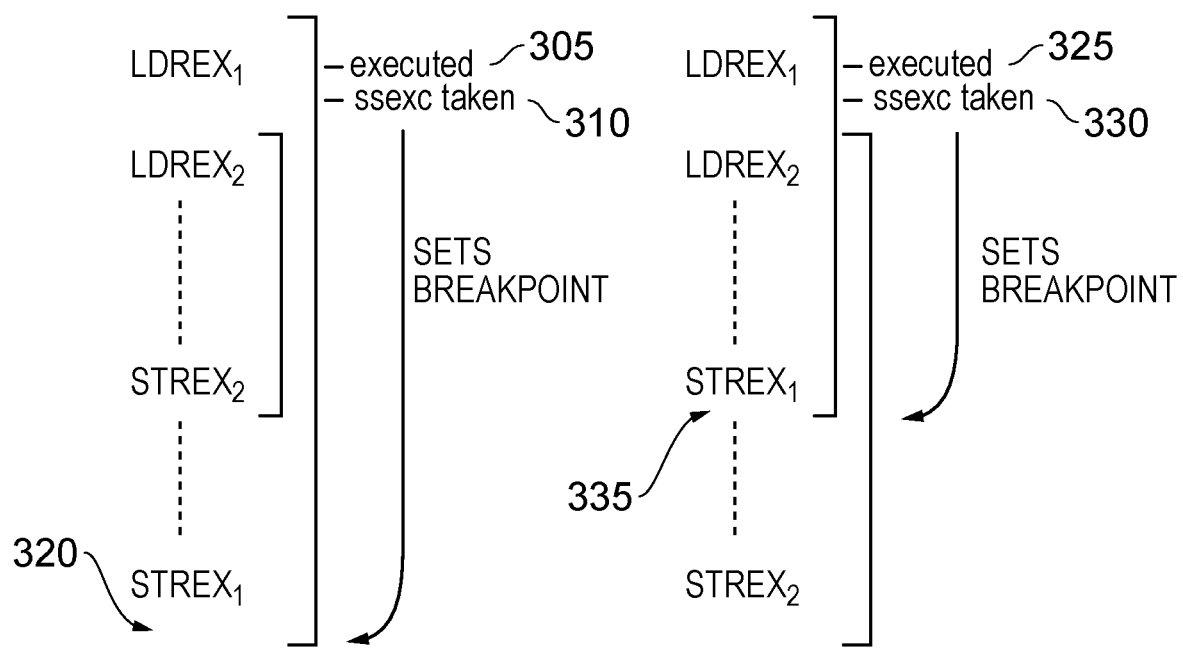
FIG. 11 schematically illustrates the special case handling that may be performed during the process of FIG. 10 in accordance with one embodiment.

In the example shown on the right-hand side of FIG. 11, a similar sequence of steps occurs, but during the special case handling at step 275, it will be determined from analysing the relevant portions of code that the second load exclusive instruction and associated instructions are not fully nested within the first load exclusive instruction and associated instructions, and accordingly, in one embodiment the breakpoint will be set at point 335, i.e. after the store exclusive instruction associated with the first load exclusive instruction.

Figure 12:
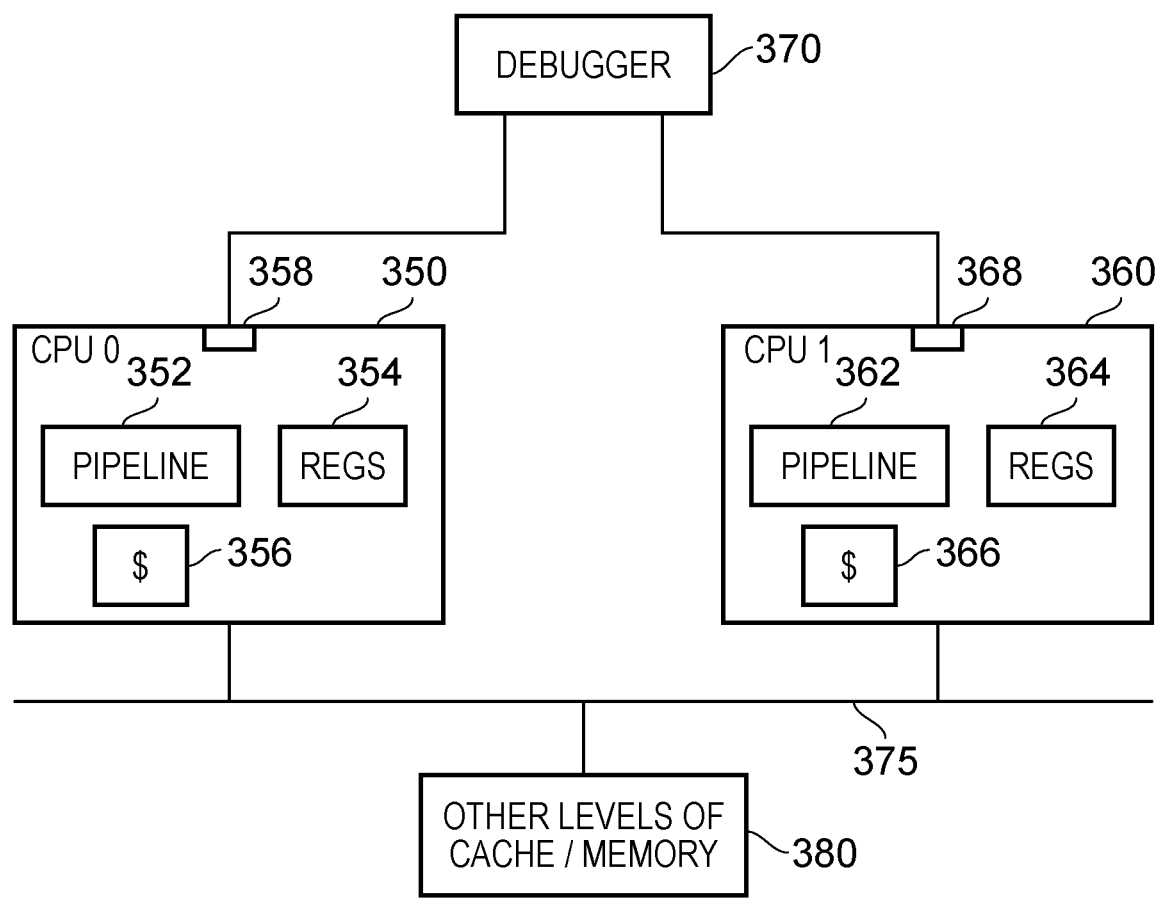
FIG. 12 illustrates an apparatus in accordance with one embodiment, where different program threads may be executed by different processors provided within the apparatus.

FIG. 12 illustrates a data processing system in accordance with one embodiment, where multiple CPUs are provided, each CPU executing at least one program thread. As with the example discussed earlier with reference to FIG. 1, each CPU will have an associated pipeline, set of registers, and local cache. Hence, the CPU0 350 has a pipeline 352, registers 354 and local cache 356, whilst the CPU1 360 has a pipeline 362, associated registers 364 and local cache 366. Each CPU 350, 360 will also have an external port 358, 368 to enable it to be connected to a diagnostic apparatus 370 such as a debugger. The various CPUs 350, 360 will typically be connected via an interconnect 375 with other levels of cache and/or main memory 380. Whilst only two CPUs are shown for ease of illustration in FIG. 12, it will be appreciated that more than two CPUs may be provided within any particular system.

Whilst in FIG. 12 an external debugger 370 is shown, in an alternative embodiment akin to the earlier described embodiment of FIG. 2, the debugger may be implemented by diagnostic software provided within the various CPUs for execution on their processors. The diagnostic software will typically run at a privileged level, for example at the operating system level or above. The diagnostic software executing on one CPU can be arranged to access one or more control registers in another CPU, for example via the interconnect 375, in order to set appropriate control registers in the other CPU so as to control certain operations on the other CPU (or can share control information with another CPU via the other levels of cache/main memory 380). For example, by such a mechanism, diagnostic software operating on CPU0 350 can be arranged to set a control register within CPU 360 so as to interrupt that CPU's execution, and cause the operating software on that CPU 360 to start its debugger software.

Hence, whilst the following examples will be discussed with reference to the hardware debugger arrangement shown in FIG. 12, they are equally applicable to the software debugger arrangement where debugging software is run on each of the CPUs as and when required.

Figure 13:
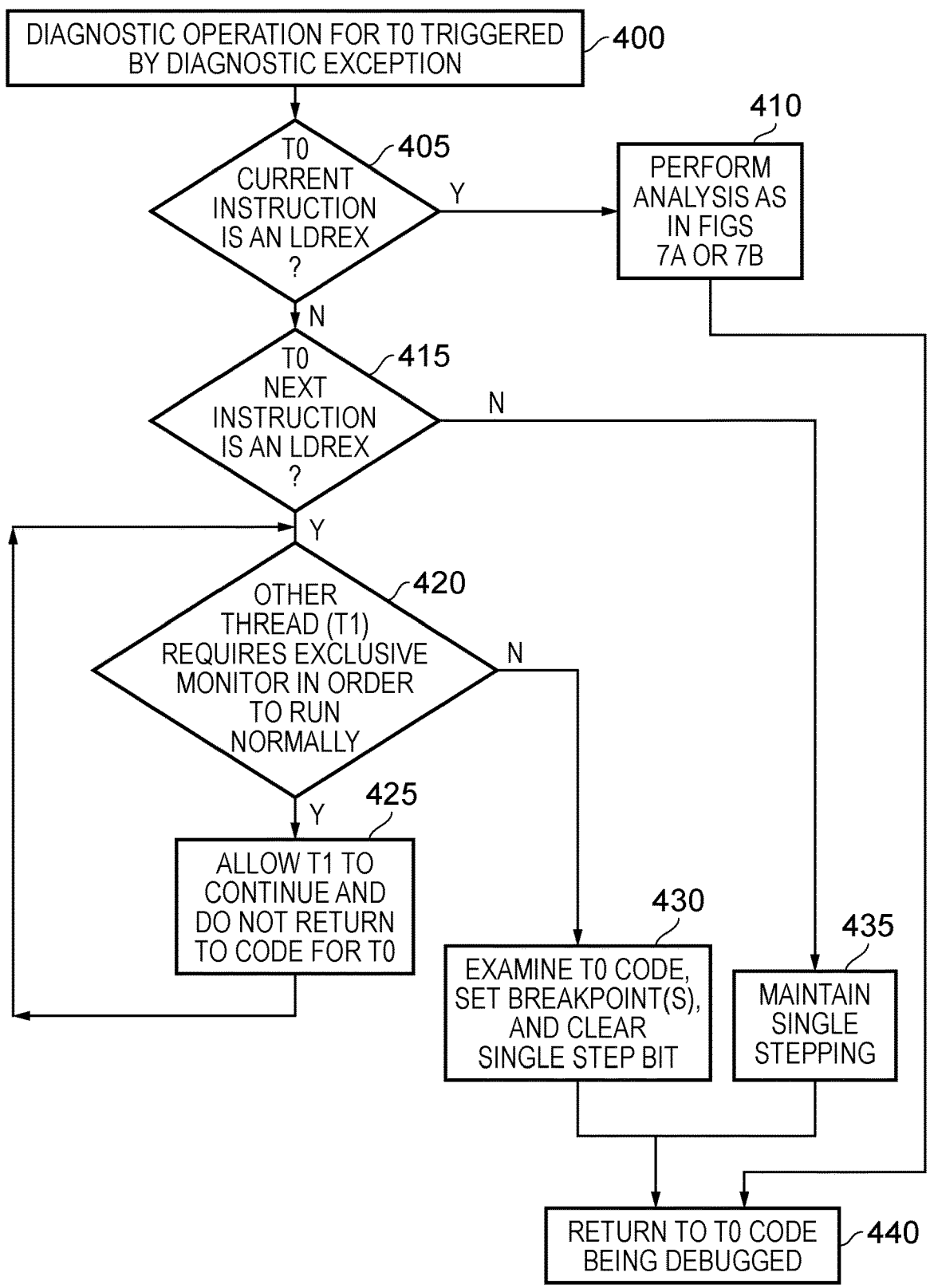
FIG. 13 is a flow diagram illustrating part of a diagnostic operation that may be performed in accordance with one embodiment having regards to the type indicator provided for the next instruction.

FIG. 13 illustrates part of a diagnostic operation that may be performed within such a multi-threaded system to further improve efficiency when performing diagnostic processes. In this example, it is assumed that CPU0 350 is executing a program thread 0 whilst being debugged using the earlier-described debugging mechanism. Meanwhile, it is assumed that CPU1 360 is executing a separate program thread (program thread 1) normally, and it is desired that CPU1's program thread executes normally during the debug process. At step 400 a diagnostic operation for thread 0 is triggered by a diagnostic exception, it being assumed that single stepping has been taking place prior to this diagnostic exception. At step 405, it is determined whether the current instruction is an LDREX instruction, and if so, then analysis of that instruction is performed in accordance with the techniques of either FIG. 7a or 7b. Thereafter, the process returns to the thread 0 code being debugged at step 440.

However, assuming it is determined at step 405 that the current instruction is not an LDREX instruction, then at step 415 it is determined whether the next instruction is an LDREX instruction. If not, then the process merely proceeds to step 435, where single stepping is maintained, and the process then returns to step 440.

However, if it is determined that the next instruction is an LDREX instruction at step 415, then the process proceeds to step 420, where during performance of the diagnostic operation it is determined whether the other thread (i.e. program thread 1 running on CPU 360) requires the relevant exclusive monitor to be set in order to run normally, i.e. the same exclusive monitor as would be set by the LDREX instruction identified at step 415 if that LDREX instruction was allowed to execute.

In the event that it is determined that the other program thread does require the exclusive monitor in order to run normally, i.e. it is currently running code that requires that exclusive monitor, or it is anticipated to shortly be running code that will require that exclusive monitor, then the process proceeds to step 425, where thread 1 is allowed to continue, and the diagnostic operation does not return at this time to the code for thread 0. The process then loops back to step 420. Step 420 can be retried at periodic intervals until such a point is reached where it is determined that the other program thread (program thread 1) no longer requires the exclusive monitor. Alternatively, during running of the diagnostic operation for CPU 350, appropriate control can be provided over the operation of CPU 360 (for example by software executing at a privileged level monitoring progress of thread 1, or by an external agent monitoring thread 1) to ensure that when CPU 360 reaches a point where it no longer requires the exclusive monitor, the diagnostic operation running on CPU 350 is notified of that fact, and at that point will trigger re-evaluation of step 420.

Once it is decided at step 420 that the other program thread no longer requires the exclusive monitor, then the process proceeds to step 430, where the relevant thread 0 code is examined, breakpoints are set as required, and then the single step bit is cleared. Step 430 essentially corresponds to the earlier described steps 265, 270, 285 of FIG. 10. Thereafter, the process proceeds to step 440, where processing returns to the thread 0 code being debugged.

Whilst the approach of FIG. 13 has the benefit that it enables the program thread 1 code to be executed normally whilst the program thread 0 code is being debugged, it will be appreciated that it is likely to introduce some delays in the analysis of the program thread 0, and hence could potentially introduce some changes in program thread 0's behaviour. In an alternative embodiment, it can instead be decided to perform the process of FIG. 14 to allow more deterministic behaviour in the operation of program thread 0 whilst it is being debugged.

Figure 14:
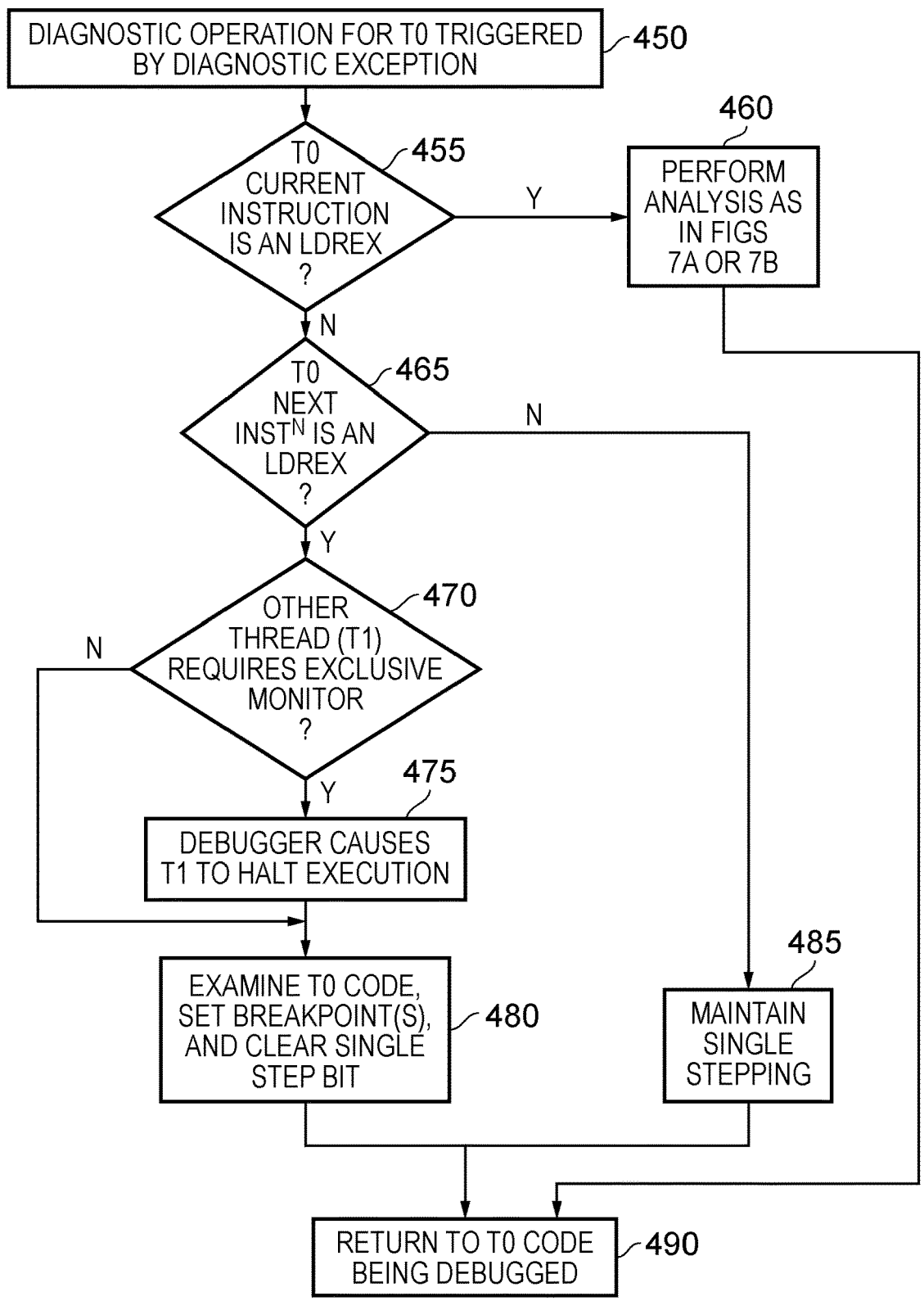
FIG. 14 is a flow diagram illustrating part of a diagnostic operation that may be performed in accordance with an alternative embodiment having regards to the type indicator provided for the next instruction.

In particular, as shown in FIG. 14, the diagnostic operation for thread 0 is triggered by a diagnostic exception at step 450. Steps 455, 460 and 465 then correspond directly with steps 405, 410 and 415 of FIG. 13. If at step 465 it is determined that the next instruction in thread 0 is an LDREX instruction, then it is determined at step 470 whether the other program thread (i.e. program thread 1) requires the exclusive monitor. If it does, then in contrast to the approach in FIG. 13, the debugger instead at step 475 causes program thread 1 to halt execution. When adopting the hardware debugger approach of FIG. 12, this can be achieved by the hardware debugger 370 contacting the CPU 360 via its port 368 in order to set a control flag that causes the processor of CPU 360 to halt its execution. If instead a software debugger approach is adopted, then the debugging software executing on CPU 350 may access a relevant register in the CPU 360 via the interconnect 375 in order to set a value in that register that causes CPU 360 to interrupt its execution of program thread 1. At that point, the operating system within CPU 360 can be arranged to start the debugger software on the CPU 360.

The process then proceeds to step 480, or proceeds directly from step 470 to step 480 in the event that it is determined that the other program thread does not require the exclusive monitor. Step 480 corresponds to step 430 described earlier in FIG. 13, and after performing step 480 then the process proceeds to step 490 where processing returns to the thread 0 code being debugged. If at step 465 it is determined that the next instruction is not an LDREX instruction, then single stepping is maintained at step 485, and the process then proceeds to step 490.

Having proceeded via steps 475 and 480 prior to returning to the thread 0 code being debugged, then it will be appreciated that the thread 0 code will then execute a plurality of instructions until the relevant breakpoint is reached, at which point a further diagnostic exception will be taken to return control to the debugger to further analyse thread 0. In addition, at this point, the debugger will issue a control signal to the CPU 360 to trigger resumption of execution of program thread 1 on that CPU. For the hardware debugger approach of FIG. 12, this can be achieved by the debugger 370 directly contacting the CPU 360 via its port 368. If instead the software debugger approach is used, then a control signal may be issued from the debugging software operating on CPU 350 to the debugging software operating on CPU 360 to cause the debugging software running on CPU 360 to return control back to its processor to continue executing program thread 1.

In accordance with the above described techniques, it will be appreciated that, based on type indicator information for a next instruction captured at the time a diagnostic exception is taken in connection with the processing of the current instruction, this can enable the debugger circuitry to take certain pre-emptive actions in order to further improve the efficiency of the diagnostic process. Indeed, in certain situations it can enable effective debugging of scenarios that would otherwise be very problematic to debug. The pre-emptive actions taken can take a variety of forms. For example, it can pre-emptively be decided in certain situations not to execute an instruction of a particular type in a single step mode before reaching the point where that instruction is first executed. In other embodiments, the process can change in advance future software execution patterns that could otherwise be problematic when performing the debugging process, for example in systems where multiple program threads are being executed in parallel.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. A method of diagnosing a processor executing a stream of instructions by causing the processor to execute the stream of instructions in a sequence of stages with a diagnostic exception being taken between each stage, the method comprising:

controlling said processor in a current stage, when a point is reached where the diagnostic exception is to be taken, to store in a storage location type indicator information comprising a type indicator for a current instruction in the stream and a type indicator for a next instruction in said stream;

taking the diagnostic exception;

performing a diagnostic operation in response to said diagnostic exception, said diagnostic operation comprising accessing said type indicator information from said storage location and, dependent on the type indicator for the current instruction and the type indicator for the next instruction, determining control information to identify at least one trigger condition for a next diagnostic exception; and returning from the diagnostic exception to cause the processor to operate in a next stage in accordance with the determined control information.

2. The method as claimed in claim 1, wherein the control information further identifies a first instruction that the processor is to execute following return from the diagnostic exception.

3. The method as claimed in claim 1, wherein:
in at least one of the stages the processor operates in a single step mode where a single instruction from the stream is executed and then the diagnostic exception is taken;
the diagnostic operation is arranged, when the type indicator information for the current stage indicates that at least one of the current instruction and the next instruction is of a predetermined type, to set the control information so that on returning from the diagnostic exception the processor operates in the next stage in a mode other than said single step mode.

4. The method as claimed in claim 3, wherein, in said mode other than said single step mode, said processor executes a plurality of instructions within said instruction stream.

5. The method as claimed in claim 4, wherein the diagnostic operation is arranged, when the type indicator information for the current stage indicates that at least one of the current instruction and the next instruction is of a predetermined type, to set the control information to identify at least one breakpoint within said instruction stream, such that in said next stage said plurality of instructions are executed until said at least one breakpoint is reached, provided no other exceptions are received during execution of said plurality of instructions, and the diagnostic exception taken at the end of the next stage is a diagnostic breakpoint exception in response to reaching said at least one breakpoint.

6. The method as claimed in claim 3, wherein in the current stage the processor operates in said single step mode, and the diagnostic operation is arranged, when the type indicator information for the current stage indicates that at least one of the current instruction and the next instruction is of a predetermined type, to set the control information so that the single step mode is exited prior to the processor operating in said next stage.

7. The method of claim 3, wherein said instruction of a predetermined type is a load exclusive instruction that sets an exclusive monitor to indicate that the stream of instructions has exclusive access to one or more storage locations.

8. The method as claimed in claim 1, wherein the current instruction is a final instruction processed by processor prior to the diagnostic exception being taken.

9. The method as claimed in claim 1, wherein:
the processor is provided within processing circuitry used to execute a plurality of program threads in parallel, and said stream of instruction are instructions of a first program thread, the method comprising:
the diagnostic operation is arranged, when the type indicator information for the current stage indicates that the next instruction is of a predetermined type, to check whether any of the other program threads in the plurality of program threads will have their execution behaviour modified were the first program thread to execute said next instruction upon returning from the diagnostic exception, and in that event to take a predetermined action prior to returning from the diagnostic exception.

10. The method as claimed in claim 9, wherein said predetermined action comprises introducing a delay before returning from the diagnostic exception, such that the return from the diagnostic exception occurs at a time where the other program threads will not have their execution behaviour modified by the first program thread executing said next instruction upon returning from the diagnostic exception.

11. The method as claimed in claim 9, wherein:
the predetermined action comprises issuing a control signal to cause halting of execution of another program thread whose execution behaviour would be modified were the first program thread to execute said next instruction upon returning from the diagnostic exception;
whereafter the processor continues to process the first program thread in the next stage on return from the diagnostic exception.

12. The method as claimed in claim 11, wherein when the diagnostic exception is taken following processing of said next stage, the diagnostic operation causes the execution of said another program thread to be resumed.

13. The method of claim 9, wherein said instruction of a predetermined type is a load exclusive instruction that sets an exclusive monitor to indicate that the stream of instructions has exclusive access to one or more storage locations.

14. The method as claimed in claim 13, wherein the diagnostic operation is arranged, when the type indicator information for the current stage indicates that the next instruction is said load exclusive instruction, to determine that another program thread in the plurality of program threads will have its execution behaviour modified were the first program thread to execute said next instruction upon returning from the diagnostic exception, when a portion of program code currently being executed for said another thread requires said exclusive monitor to be set.

15. The method as claimed in claim 9, wherein said processing circuitry includes at least one further processor, and said other program threads are executed on said at least one further processor.

16. An apparatus for diagnosing a processor executing a stream of instructions by causing the processor to execute the stream of instructions in a sequence of stages with a diagnostic exception being taken between each stage, said processor being controlled in a current stage, when a point is reached where the diagnostic exception is to be taken, to store in a storage location type indicator information comprising a type indicator for a current instruction in the stream and a type indicator for a next instruction in said stream, the diagnostic apparatus comprising:
diagnostic circuitry to perform a diagnostic operation in response to said diagnostic exception being taken; and
an interface mechanism from which to issue control information to the processor, and via which said type indicator information stored by the processor can be retrieved;
the diagnostic circuitry being arranged, when performing said diagnostic operation, to retrieve via said interface mechanism said type indicator information from said storage location and, dependent on the type indicator for the current instruction and the type indicator for the next instruction, to determine the control information to identify at least one trigger condition for a next diagnostic exception, and to provide said control information via said interface mechanism to said processor so that, on returning from the diagnostic exception, the processor is caused to operate in a next stage in accordance with the determined control information.

17. An apparatus comprising:

a processor to execute a stream of instructions in a sequence of stages with a diagnostic exception being taken between each stage; and storage accessible to the processor;

said processor being arranged in a current stage, when a point is reached where the diagnostic exception is to be taken, to store, in a storage location of said storage, type indicator information comprising a type indicator for a current instruction in the stream and a type indicator for a next instruction in said stream;

said storage being updated to provide control information for a next stage in response to a diagnostic operation being performed on taking the diagnostic exception, the control information being determined dependent on the type indicator for the current instruction and the type indicator for the next instruction as stored for the current stage, and the control information identifying at least one trigger condition for a next diagnostic exception;

said processor being arranged, on return from the diagnostic exception, to operate in the next stage in accordance with the control information stored in said storage.

18. A system comprising:

a processor to execute a stream of instructions in a sequence of stages with a diagnostic exception being taken between each stage, the processor being controlled in a current stage, when a point is reached where the diagnostic exception is to be taken, to store in a storage location type indicator information comprising a type indicator for a current instruction in the stream and a type indicator for a next instruction in said stream; and diagnostic circuitry, responsive to the diagnostic exception being taken, to perform a diagnostic operation, said diagnostic operation comprising accessing said type indicator information from said storage location and, dependent on the type indicator for the current instruction and the type indicator for the next instruction, determining control information to identify at least one trigger condition for a next diagnostic exception;

the processor being arranged, on return from the diagnostic exception, to operate in a next stage in accordance with the determined control information provided by the diagnostic circuitry.

* * * * *